US011812295B2

(12) United States Patent
Berliner et al.

(10) Patent No.: US 11,812,295 B2
(45) Date of Patent: Nov. 7, 2023

(54) BEAM REFINEMENT WITH SIMULTANEOUS SPATIAL-DIVISION MULTIPLEXED BEAMS

(71) Applicant: QUALCOMM INCORPORATED, San Diego, CA (US)

(72) Inventors: Ran Berliner, Kfar Aviv (IL); Shay Landis, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/248,709

(22) Filed: Feb. 3, 2021

(65) Prior Publication Data
US 2022/0248246 A1  Aug. 4, 2022

(51) Int. Cl.
*H04W 24/10* (2009.01)
*H04B 7/06* (2006.01)
*H04W 72/044* (2023.01)
*H04L 5/00* (2006.01)

(52) U.S. Cl.
CPC .......... *H04W 24/10* (2013.01); *H04B 7/0617* (2013.01); *H04L 5/0048* (2013.01); *H04W 72/046* (2013.01)

(58) Field of Classification Search
CPC .. H04B 7/0617; H04B 7/0626; H04B 7/0695; H04B 7/088; H04L 5/0048; H04L 5/0051; H04L 27/2626; H04W 8/22; H04W 24/10; H04W 72/042; H04W 72/046
See application file for complete search history.

(56) References Cited

U.S. PATENT DOCUMENTS

| 2018/0269939 | A1* | 9/2018 | Hu | H04B 7/0626 |
| 2018/0323845 | A1* | 11/2018 | Chang | H04B 7/0626 |
| 2019/0253119 | A1* | 8/2019 | Lo | H04B 7/0695 |
| 2019/0387417 | A1* | 12/2019 | Nilsson | H04B 7/088 |
| 2020/0014511 | A1* | 1/2020 | Nakamura | H04W 72/042 |
| 2020/0107352 | A1* | 4/2020 | Tsai | H04L 5/0051 |
| 2022/0150849 | A1* | 5/2022 | Zhao | H04L 27/2626 |
| 2022/0166489 | A1* | 5/2022 | Takano | H04W 48/16 |

* cited by examiner

*Primary Examiner* — Benjamin H Elliott, IV
*Assistant Examiner* — Prince A Mensah
(74) *Attorney, Agent, or Firm* — Haynes and Boone, LLPP/Qualcomm Incorporated

(57) ABSTRACT

Wireless communications systems and methods related to beam refinement with simultaneous spatial-division multiplexed beams are provided. A user equipment (UE) receives, from a base station (BS), a plurality of reference signals in a set of beam directions. The receiving includes receiving, simultaneously during a first symbol, at least a first reference signal of the plurality of reference signals in a first beam direction of the set of beam directions and a second reference signal of the plurality of reference signals in a second beam direction of the set of beam directions, where the second beam direction is different from the first beam direction. The UE transmits, to the BS, a beam report indicating received signal measurements for two or more beam directions of the set of beam directions.

28 Claims, 13 Drawing Sheets

BEAM REFINEMENT WITH SIMULTANEOUS SPATIAL-DIVISION MULTIPLEXED BEAMS

TECHNICAL FIELD

This application relates to wireless communication systems, and more particularly to performing beam refinement between wireless communication devices (e.g., between a base station or multiple transmission-reception points (TRPs) and a user equipment) using simultaneous spatial-division multiplexed beams.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

As use cases and deployment scenarios continue to expand in wireless communication, extending NR from mmWave frequency ranges to sub-terahertz (sub-THz) frequency ranges may also yield benefits. For instance, sub-THz frequency spectrum can provide wide-bandwidth channels and ultra-high data rates.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a user equipment (UE). The method includes receiving, from a base station (BS), a plurality of reference signals in a set of beam directions, where the receiving includes receiving, simultaneously during a first symbol, at least a first reference signal of the plurality of reference signals in a first beam direction of the set of beam directions and a second reference signal of the plurality of reference signals in a second beam direction of the set of beam directions, where the second beam direction is different from the first beam direction; and transmitting, to the BS, a beam report indicating received signal measurements for two or more beam directions of the set of beam directions.

In an additional aspect of the disclosure, a method of wireless communication performed by a base station (BS). The method includes transmitting, to a user equipment (UE), a plurality of reference signals in a set of beam directions, where the transmitting includes transmitting, simultaneously during a first symbol, at least a first reference signal of the plurality of reference signals in a first beam direction of the set of beam directions and a second reference signal of the plurality of reference signals in a second beam direction of the set of beam directions, where the second beam direction is different from the first beam direction; and receiving, from the UE, a beam report indicating received signal measurements for two or more beam directions of the set of beam directions.

In an additional aspect of the disclosure, a user equipment (UE) includes a processor; and a transceiver coupled to the processor, where the transceiver is configured to receive, from a base station (BS), a plurality of reference signals in a set of beam directions, where the receiving includes receiving, simultaneously during a first symbol, at least a first reference signal of the plurality of reference signals in a first beam direction of the set of beam directions and a second reference signal of the plurality of reference signals in a second beam direction of the set of beam directions, where the second beam direction is different from the first beam direction; and transmit, to the BS, a beam report indicating received signal measurements for two or more beam directions of the set of beam directions.

In an additional aspect of the disclosure, a base station (BS) includes a processor; and a transceiver coupled to the processor, where the transceiver is configured to transmit, to a user equipment (UE), a plurality of reference signals in a set of beam directions, where the transmitting includes transmitting, simultaneously during a first symbol, at least a first reference signal of the plurality of reference signals in a first beam direction of the set of beam directions and a second reference signal of the plurality of reference signals in a second beam direction of the set of beam directions, where the second beam direction is different from the first beam direction; and receiving, from the UE, a beam report indicating received signal measurements for two or more beam directions of the set of beam directions.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
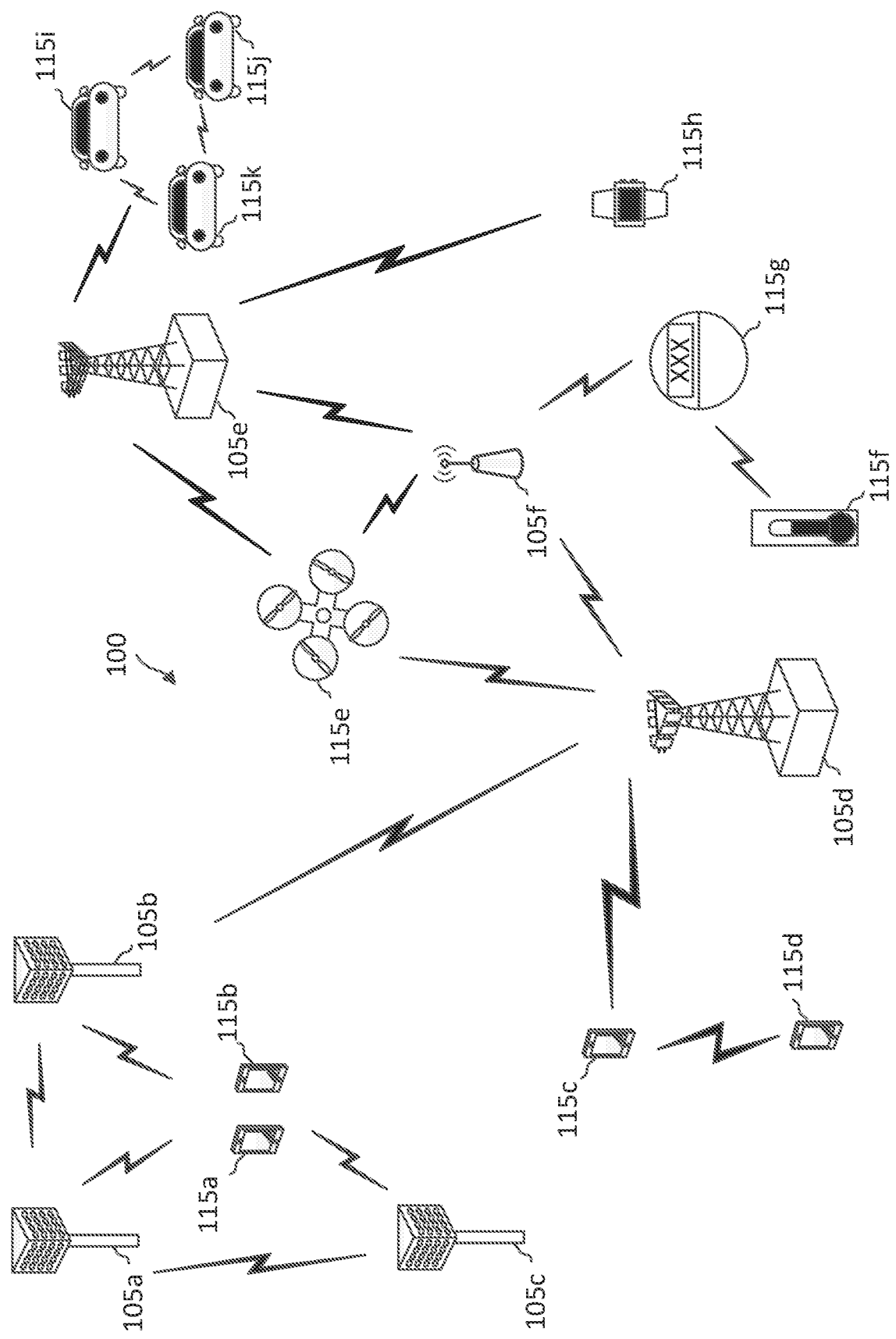
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

Wireless communications at high frequencies, such as mmWave frequency ranges, may experience a high path-loss compared to lower frequency bands that are commonly used in conventional communication systems. To overcome the high path-loss, BSs and UEs may use beamforming techniques to form directional beams for communications. For instance, a BS and/or a UE may be equipped with one or more antenna panels or antenna arrays with antenna elements that can be configured to focus transmit signal energy and/or receive signal energy in a certain spatial direction and/or within a certain spatial angular sector or width. A beam used for such wireless communications may be referred to as an active beam, a best beam, or a serving beam. The active beam may initially be selected from reference beams and then refined over time.

As used herein, the term "transmission beam" may refer to a transmitter transmitting a beamformed signal in a certain spatial direction or beam direction and/or with a certain beam width covering a certain spatial angular sector. The transmission beam may have characteristics such as the beam direction and the beam width. As used herein, the term "reception beam" may refer to a receiver using beamforming to receive a signal from a certain spatial direction or beam direction and/or within a certain beam width covering a certain spatial angular sector. The reception beam may have characteristics such as the beam direction and the beam width. As used herein, the term "beam sweep" or "beam sweeping" may refer to a wireless communication device using sequentially each beam of a set of predefined beams (directing to a set of predefined spatial directions) for transmissions or receptions over a time period to cover a certain angular sector spatially.

In 5G, beam management is divided into three phases, which may be referred to as P1, P2, and P3. P1 is an initial beam pairing or beam discovery procedure performed prior to a connection is established between a BS and a UE. In this regard, a BS may implement periodic synchronization signal block (SSB) beam sweeping where the BS transmits SSBs across a set of beam directions (using a set of transmission beams at the BS) such that several relevant areas of a cell are reached. At the same time, a UE desiring to communicate with the BS may determine an optimal reception beam based on the SSB beams. In this regard, a UE may sweep across a set of beam directions (using a set of reception beams at the UE) to search for an appropriate beam direction for communicating with the BS. The UE may apply a different reception beam for each occurrence of the periodic SSBs. The UE may initiate a random access procedure with the BS using the determined reception beam. Upon completing the random access procedure, the UE and the BS may establish a connection with each other.

P2 is a beam refinement procedure performed between the BS and the UE while the UE is in a connected mode (e.g., with an established connection to the BS). During the P2 procedure, the BS may perform transmission beam sweep in a narrower angular sector than during the P1 procedure to refine the BS transmission beam. In this regard, the BS may transmit beam measurement signals (e.g., channel state information-reference signals (CSI-RSs)) using a set of narrow beams closest to the wide beam used for communicating with the UE during the P1 procedure. The UE may determine a received signal measurement (e.g., a layer 1-reference signal received power (L1-RSRP)) or other beam characteristics for each BS's transmission beam or DL beam using a fixed received beam (the optimal reception beam determined during P1). The UE may report the receive signal measurements to the BS, for example, in the form of a sorted list of signal measurements from a highest received signal power to a lowest received signal power or vice versa. In some other examples, the UE may report received signal measurements for DL beams that satisfies a certain threshold. In yet some other examples, the UE may report received signal measurements for N best DL beams (with the higher receive signal measurement among all the DL beams). The BS and/or the UE may select an optimal DL beam (BS transmission beam) for subsequent communications.

P3 is a beam refinement procedure performed between the BS and the UE while the UE is in a connected mode, for example, after performing the P2 procedure. During the P3 procedure, the BS may transmit reference signals (e.g., CSI-RSs) using the narrow transmission beam selected from P2 while the UE sweeps across a set of beam directions (using reception beams at the UE) to refine the UE reception beam. The UE may determine a signal measurement for each of the reception beams and select the reception beam with the highest signal measurement for subsequent communication with the BS.

In some aspects, it may be desirable to extend NR further into sub-terahertz (sub-THz) frequency ranges (e.g., at about 140 GHz or higher) to take advantage of the availability of ultra-wide spectrum resources. For example, sub-THz band can provide terabits per second (Tbps) links. However, moving to higher frequencies also lead to higher path-loss due to the shorter wavelengths. To overcome the higher path-loss, networks operating over the sub-THz frequency ranges may deploy BSs with a vast number of transmission-reception points (TRPs) and/or in smaller areas to reduce the distance or range between a BS and a UE or between a TRP and a UE. In this regard, a BS may include multiple TRPs located at different geographical areas, where the TRPs may operate as radio-heads providing radio frontend (RF) functionalities for over-the-air communications. In some scenarios, certain BS functionalities (e.g., protocol stack related functions) may also be distributed to the TRPs. The TRPs may be located closer to certain UEs, and the BS may communicate with the UEs via the TRPs to reduce the communication range. Additionally, the BSs and/or TRPs may communicate with the UEs using narrower or more focused beams (e.g., laser-like beams) to combat the higher path-loss. In such deployment scenarios, it is possible to take further advantages of the vast number of TRPs and the narrower beams by configuring multiple TRPs to communicate different data streams with the UEs in a spatial-division-multiplexing (SDM) manner to provide further increase in data rates. In this regard, different TRPs may be located at different spatial directions from the UE. As such, the UE may use different beams (directing to different beam directions) to communicate with different TRPs. The different beam directions along with the narrower beams can enable simultaneous transmission of different data streams from different TRPs to the UE, and thereby increasing data throughputs.

However, the use of narrower beams and multi-TRPs can cause challenges. For example, as the beams become narrower, the number of beams a BS or TRP may sweep to cover a certain spatial sector or area increases. In some examples, to cover a certain spatial sector or area, the number of beams a BS or TRP may sweep may increase by a factor of about 20, 25, or 30 when moving from mmWave frequency ranges to the sub-THz frequency ranges. In current beam refinement, a BS sweeps one beam at a time (e.g., using one OFDM symbol per beam direction). As such, when the number of beams in a beam sweep increases, beam refinement overhead in terms of resources and duration also increases. Further, the UE may also perform beam refinement with each of the TRPs. The number of TRPs that a UE may communicate with in sub-THZ frequency ranges may also increase compared to mmWave frequency ranges. For example, a UE may communicate with 3, 4, 5, or more TRPs in the sub-THz frequency ranges instead of 2 TRPs in the mmWave frequency ranges. As such, beam refinement can be inefficient in sub-THz frequency ranges.

The present application describes mechanisms for performing beam refinement efficiently in high frequency bands, such as sub-THz frequency ranges. For beam refinement, a BS may transmit a plurality of reference signals (e.g., CSI-RSs) by sweeping across a set of beam directions to allow a UE to perform signal measurements and refine a beam selection for communicating with the BS. In this regard, the BS may transmit a reference signal in each of the beam directions. To reduce the amount of time it takes to sweep through the entire set of beam directions, the BS may transmit multiple reference signals each in a different beam direction at the same time. For instance, the BS may transmit, simultaneously during a first symbol, at least a first reference signal of the plurality of reference signals in a first beam direction of the set of beam directions and a second reference signal of the plurality of reference signals in a second beam direction of the set of beam directions, where the second beam direction is different from the first beam direction. The UE may receive the plurality of reference signals from the BS. The UE may receive, simultaneously during the first symbol, the first reference signal in the first beam direction using a first reception beam and the second reference signal in the second beam direction using a second reception beam different from the first reception beam. In some aspects, the UE may include one or more antenna panels, for example, located on different sides or different edges of the UE. In some aspects, the first reception beam and the second reception beam can be from the same antenna panel. In some other aspects, the first reception beam and the second reception be can be from different antenna panels. In some aspects, the BS may communicate with the UE via multiple TRPs, and may transmit the first reference signal via a first TRP and transmit the second reference signal via a second TRP different from the first TRP.

To facilitate simultaneous transmissions in different beam directions, the BS may configure the UE with resources associated with different beam directions on the same symbol. In some aspects, the BS may configure the UE with a resource set (e.g., a CSI-RS resource set) including at least a first resource associated with the first beam direction and a second resource associated with the second beam direction on the same first symbol. In some other aspects, the BS may configure the UE with multiple resource sets (e.g., CSI-RS resources sets) for simultaneous SDM-based transmissions. For instance, the BS may configure the UE with at least a first resource set and a second resource set. The first resource set may include a first resource associated with the first beam direction on the first symbol, and the second resource set may include a second resource associated with the second beam direction on the same first symbol.

In some aspects, the UE may transmit a capability report indicating whether the UE can support simultaneous measurements in multiple beam directions during a same symbol or not. If the UE can support simultaneous measurements in multiple beam directions during a same symbol, the BS may transmit multiple reference signals in different beam directions per symbol during a beam sweep to reduce beam refinement overhead.

The UE may receive the plurality of reference signals according to the configured resources. The UE may determine received signal measurements (e.g., L1-RSRP) for the plurality of reference signals in the set of beam directions and may report the received signal measurements to the BS. In some aspects. the UE may report the received signal measurements in a sorted list, for example, from the highest received signal measurement to the lowest received signal measurements or vice versa. The report may include the received signal measurements and corresponding beam directions. In some aspects, the UE may transmit a report indicating received signal measurements for two or more beam directions of the set of beam directions, for example a received signal measurement for each of two or more beam directions of the set of beam directions or one or more received signal measurements for each of two or more beam directions of the set of beam directions. In some aspects, the UE may report a received signal measurement for each beam direction of the set of beam directions. In some aspects, the UE may report receive signal measurements for beam directions that satisfy a certain receive signal measurement threshold, for example a received signal measurement for each beam directions satisfying a certain receive signal measurement threshold.

Aspects of the present disclosure can provide several benefits. For example, by allowing a BS to transmit multiple reference signals in different beam directions simultaneously on the same symbol during beam refinement, the amount of time for completing the beam refinement may be reduced. Additionally, by allowing multiple TRPs (associated with a same BS) to transmit multiple reference signals in different beam directions simultaneously on the same symbol during beam refinement, the present disclosure may allow for concurrent BS beam refinement with multiple TRPs. Further, the use of narrower beams and a greater number of TRPs can allow different TRPs to transmit different data streams to the UE at the same time using SDM, and thereby increasing data throughputs.

FIG. 1 illustrates a wireless communication network 100 according to some aspects of the present disclosure. The network 100 may be a 5G network. The network 100 includes a number of base stations (BSs) 105 (individually labeled as 105*a*, 105*b*, 105*c*, 105*d*, 105*e*, and 105*f*) and other network entities. A BS 105 may be a station that communicates with UEs 115 (individually labeled as 115*a*, 115*b*, 115*c*, 115*d*, 115*e*, 115*f*, 115*g*, 115*h*, and 115*k*) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*e*, which may be a drone. Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-step-size configurations by communicating with another user device which relays its information to the network, such as the UE 115*f* communicating temperature measurement information to the smart meter, the UE 115*g*, which is then reported to the network through the small cell BS 105*f*. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit primary synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission. The combined random access preamble and connection request in the two-step random access procedure may be referred to as a message A (MSG A). The combined random access response and connection response in the two-step random access procedure may be referred to as a message B (MSG B).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using hybrid automatic repeat request (HARQ) techniques to improve communication reliability, for example, to provide a ultra-reliable low-latency communication (URLLC) service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 decodes the DL data packet successfully, the UE 115 may transmit a HARQ acknowledgement (ACK) to the BS 105. Conversely, if the UE 115 fails to decode the DL transmission successfully, the UE 115 may transmit a HARQ negative-acknowledgement (NACK) to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple bandwidth parts (BWPs) (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

Figure 2:
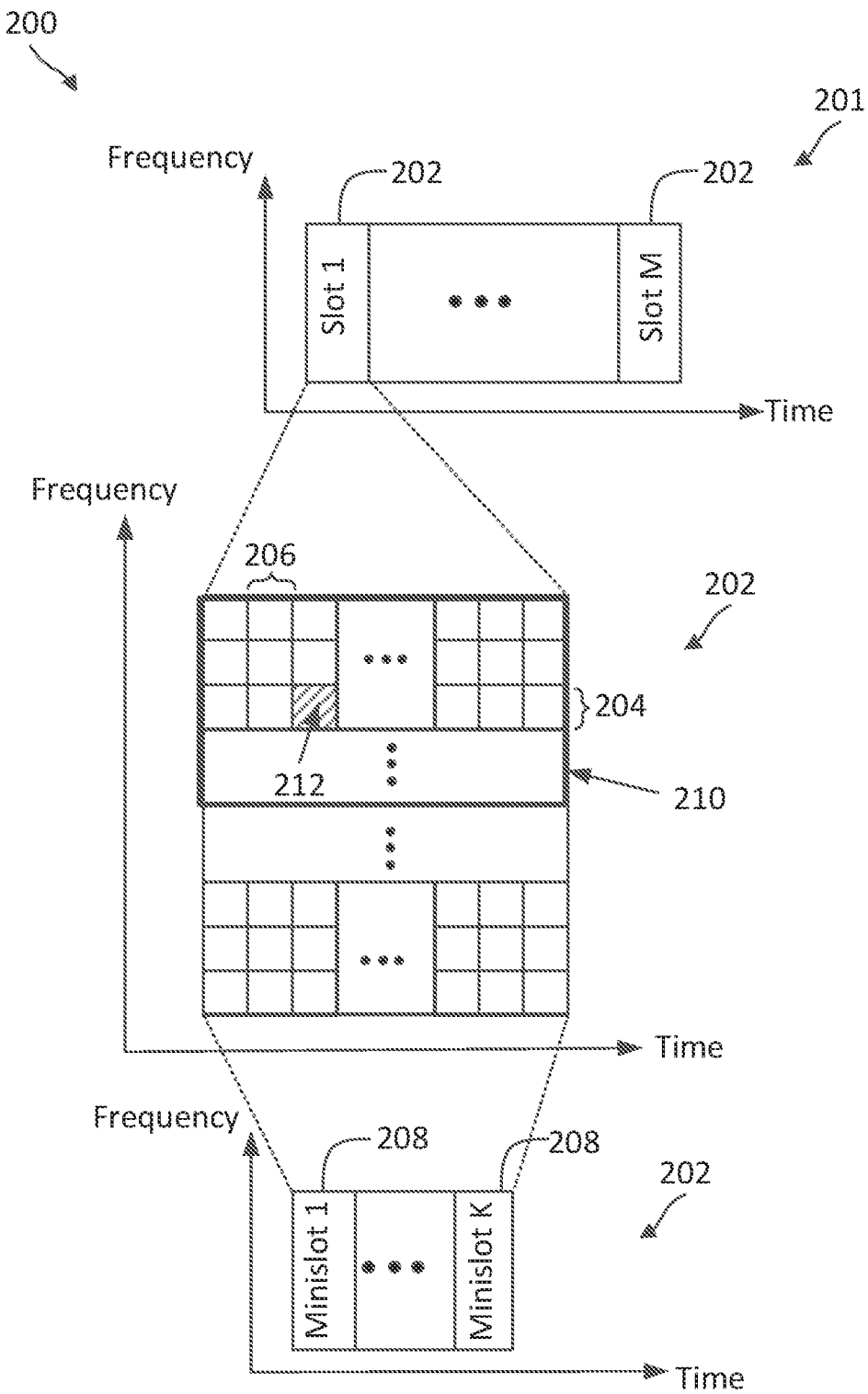
FIG. 2 is a timing diagram illustrating a radio frame structure according to some aspects of the present disclosure

FIG. 2 is a timing diagram illustrating a radio frame structure 200 according to some aspects of the present disclosure. The radio frame structure 200 may be employed by BSs such as the BSs 105 and UEs such as the UEs 115 in a network such as the network 100 for communications. In particular, the BS may communicate with the UE using time-frequency resources configured as shown in the radio frame structure 200. In FIG. 2, the x-axes represent time in some arbitrary units and the y-axes represent frequency in some arbitrary units. The radio frame structure 200 includes a radio frame 201. The duration of the radio frame 201 may vary depending on the aspects. In an example, the radio frame 201 may have a duration of about ten milliseconds. The radio frame 201 includes M number of slots 202, where M may be any suitable positive integer. In an example, M may be about 10.

Each slot 202 includes a number of subcarriers 204 in frequency and a number of symbols 206 in time. The number of subcarriers 204 and/or the number of symbols 206 in a slot 202 may vary depending on the aspects, for example, based on the channel bandwidth, the subcarrier spacing (SCS), and/or the cyclic prefix (CP) mode. The CP mode specifies a CP length (a number of samples) for an OFDM symbol (e.g., the symbol 206). One subcarrier 204 in frequency and one symbol 206 in time forms one resource element (RE) 212 for transmission. A resource block (RB) 210 is formed from a number of consecutive subcarriers 204 in frequency and a number of consecutive symbols 206 in time.

In some aspects, a BS (e.g., BS 105 in FIG. 1) may schedule a UE (e.g., UE 115 in FIG. 1) for UL and/or DL communications at a time-granularity of slots 202 or mini-slots 208. Each slot 202 may be time-partitioned into K number of mini-slots 208. Each mini-slot 208 may include one or more symbols 206. The mini-slots 208 in a slot 202 may have variable lengths. For example, when a slot 202 includes N number of symbols 206, a mini-slot 208 may have a length between one symbol 206 and (N−1) symbols 206. In some aspects, a mini-slot 208 may have a length of about two symbols 206, about four symbols 206, or about seven symbols 206. In some examples, the BS may schedule UE at a frequency-granularity of a resource block (RB) 210 (e.g., including about 12 subcarriers 204 in 1 symbol, 2 symbols, . . . , 14 symbols).

In some aspects, the network 100 may operate over a high frequency band, for example, in a frequency range 2 (FR2) band, frequency range 4 (FR4) band, or a frequency range 2 (FR5) band. FR2 may refer to in mmWave frequency ranges. FR4 and FR5 may refer to sub-THz frequency ranges. To overcome the high path-loss at high frequency, the BSs 105 and the UEs 115 may communicate with each other using beamforming to generate directional beams for transmissions and/or receptions as shown in FIG. 3.

Figure 3:
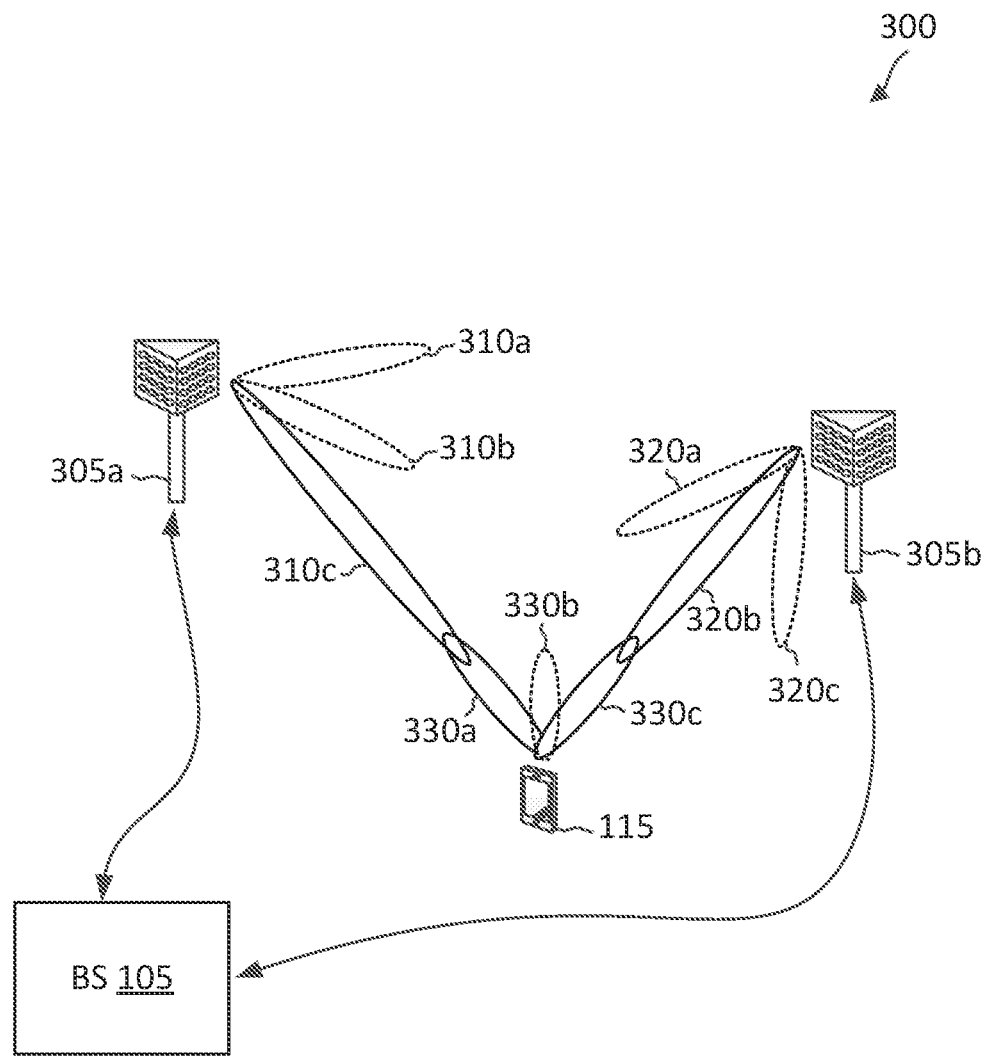
FIG. 3 illustrates a wireless communication network that supports directional beamforming according to some aspects of the present disclosure.

FIG. 3 illustrates a wireless communication network 300 that supports directional beamforming according to some aspects of the present disclosure. The network 300 may correspond to a portion of the network 100. FIG. 3 illustrates one BS 105 in communication with two TRPs 305 (shown as 305a and 305b) serving one UE 115 for simplicity of illustration and discussion, though it will be recognized that aspects of the present disclosure may scale to any suitable number of UEs 115 (e.g., about 2, 3, 4, 6, 7 or more) and/or TRPs 305 (e.g., about 2, 3 or more). In some instances, the TRPs 305 may also be referred to as radio heads. The TRPs 305 may implement at least some RF functionalities for over-the-air communications with the UE 115. In some instances, the BS 105 may also distribute some other functionalities such as baseband processing and/or protocol stack processing to the TRPs 305. In some instances, at least one of the TRPs 305 can be co-located with the BS 105. In some instances, both TRPs 305 can be located remotely from the BS 105. The BS 105 may schedule the TRPs 305 to communicate with the UE 115, for example, using SDM as will be discussed more fully below. The UE 115 may be similar to UEs 115. The TRPs 305 and the UE 115 may communicate with each other over a high-frequency band, for example, in a mmWave frequency range or a sub-THz range.

In FIG. 3, the TRPs 305 and the UE 115 may use beamforming techniques to generate transmit and/or reception beams for transmissions and/or receptions, respectively. In this regard, the TRP 305a may generate a set of transmission beams 310 (shown as 310a, 310b, and 310c) in a set of predefined beam directions. The TRP 305b may generate a set of transmission beams 320 (shown as 320a, 320b, and 320c) in a set of predefined beam directions. The UE 115 may generate a set of reception beams 330 (shown as 330a, 330b, and 330c) in a set of predefined beam directions. Additionally, each of the beams 310a-310c, 320a-320c, and 330a-330c may have a certain beam width covering a certain spatial angular sector. Although FIG. 3 illustrates three beams for each of the TRP 305a, TRP 305b, and the UE 115, it should be understood that in other examples each of the TRP 305a, TRP 305b, and the UE 115 can utilize a fewer beams or a greater number of beams for communication.

In the illustrated example of FIG. 3, the TRP 305a communicates with the UE 115 in a DL direction using the transmission beam 310c, and the TRP 305b communicates with the UE 115 in a DL direction using the transmission beam 320b. The UE 115 receives DL communications from the TRP 305a using the reception beam 330a and from the TRP 305b using the reception beam 330c. Although FIG. 3 illustrates the TRP 305a and the TRP 305b communicate with the UE 115 using beams that are along a line-of-sight (LOS) propagation path (e.g., between the beam 310c at the TRP 305a and the beam 330a at the UE 115, and between the beams 320b at the TRP 305b and the beam 330c at the UE 115), it should be understood that in other examples the TRP 305a and/or the TRP 305b may use a transmission beam that is non-line-of-sight (NLOS) (e.g., reflected off a reflector or scatterer in the environment) to communicate with the UE 115 for communication.

In some aspects, each of the TRP 305a, TRP 305b, and the UE 115 may have one or more antenna panels or one or more antenna arrays each comprising a plurality of antenna elements. The antenna elements can be individually controlled to adjust the gain and/or phase such that an antenna array or an antenna panel can be configured to focus a transmit signal in a certain beam direction and/or to focus in a certain beam direction for receiving a signal.

In some aspects, depending on the environment (e.g., reflectors and/or scatterers), the TRP 305a and/or the TRP 305b may communicate with the UE 115 in a UL direction in the same beam direction. In other words, the TRP 305a may generate a reception beam in the same beam direction as the beam 310c for receiving UL communications from the UE 115, and the TRP 305b may generate a reception beam in the same beam direction as the beam 320b for receiving UL communications from the UE 115. Similarly, the UE 115 may generate a transmission beam in the same beam direction as the beam 330a for transmitting UL communications to the TRP 305a, and may generate a transmission beam in the same beam direction as the beam 330c for transmitting UL communications to the TRP 305b. In some other aspects, the TRP 305a and the UE 115 may communicate with each other in different beam directions for UL and for DL. Similarly, the TRP 305b and the UE 115 may communicate with each other in different beam directions for UL and for DL.

In some aspects, prior to exchanging data between a UE (e.g., the UEs 115) and a BS (e.g., the BSs 105), the UE and/or the BS may determine an optimal UL-DL beam pair for communications. In this regard, the BS and the UE may perform an initial beam pair selection. Subsequently, the BS and the UE may refine the initial beam selection as will be discussed more fully below with reference to FIGS. 4 and 5.

Figure 4:
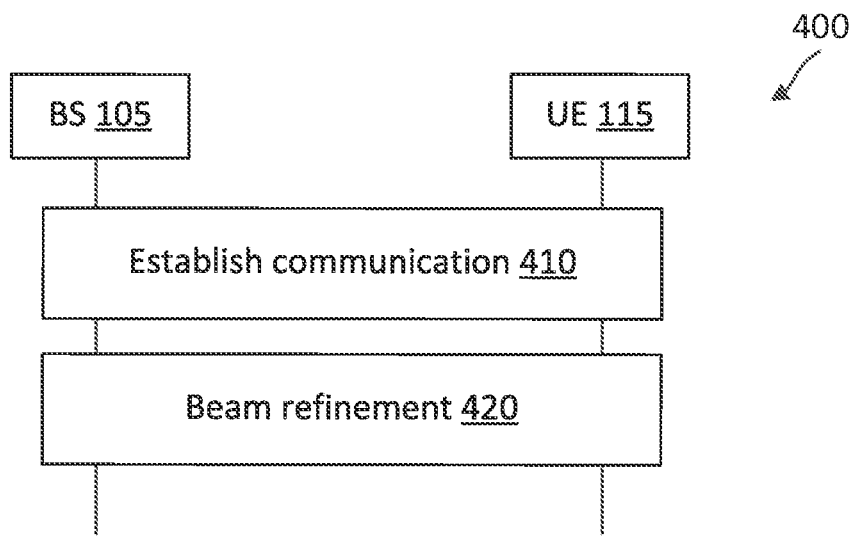
FIG. 4 is a sequence diagram illustrating a communication method with beam refinement operations according to some aspects of the present disclosure.

FIG. 4 is a sequence diagram illustrating a communication method 400 with beam refinement operations according to some aspects of the present disclosure. The method 400 may be performed by wireless networks, such as the networks 100 and/or 300 communicating over a high-frequency band, such as a mmWave band or a sub-THz band. In this regard, the method 400 is performed by a BS 105 and a UE 115. In some aspects, the BS 105 may utilize one or more components, such as the processor 1102, the memory 1104, the beam module 1108, the transceiver 1110, the modem 1112, and the one or more antennas 1116 shown in FIG. 11, to execute the actions of the method 400. The UE 115 may utilize one or more components, such as the processor 1202, the memory 1204, the beam module 1208, the transceiver 1210, the modem 1212, and the one or more antennas 1216 shown in FIG. 12, to execute the actions of the method 400.

At action 410, the BS 105 and the UE 115 establish a communication with each other. In this regard, the BS 105 may transmit SSBs by sweeping across a set of DL beams (e.g., the beams 310 and/or 320) in a set of predefined beam directions similar to the P1 procedure described above. In some instances, the BS 105 may utilize TRPs (e.g., the TRPs 305) to communicate with the UE 115. For simplicity of illustration and discussion, the method 400 is discussed from the perspective of a single TRP co-located with the BS 105 or at a remote location from the BS 105. However, similar communications may also occur for other TRPs that are in communication with the BS 105. The BS 105 may repeat the SSB transmissions at a certain time interval (e.g., periodically) in the set of beam directions to allow the UE 115 to perform initial network access. In some instances, each beam and its corresponding characteristics may be identified by a beam index. For instance, each SSB may include an indication of a beam index corresponding to the beam used for the SSB transmission. At the same time, the UE 115 may determine signal measurements, such as reference signal received power (RSRP) and/or reference signal received quality (RSRQ), for the SSBs at the different beam directions. In some aspects, the UE 115 may also sweep across a set of reception beams (e.g., the beams 330) when monitoring for SSBs from the BS 105. The UE 115 may apply a different reception beam for each occurrence of the periodic SSBs. The UE 115 may determine an optimal transmit-reception beam pair (with the highest RSRP or highest RSRQ) for establishing the communication with the BS 105. The optimal transmit-reception beam pair may include a best DL beam or transmission beam from the BS 105 and a best reception beam at the UE. The UE 115 may indicate the selection by transmitting a PRACH signal (e.g., MSG1) using PRACH resources associated with the selected beam direction. For instance, the SSB transmitted in a particular beam direction may indicate PRACH resources that may be used by a UE 115 to communicate with the BS 105 in that particular beam direction. After selecting the best DL beam, the UE 115 may complete the random access procedure (e.g., the 4-step random access or the 2-step random access) and establish a connection (e.g., an RRC connection) with the BS 105.

At action 420, after establishing the connection, the BS 105 and the UE 115 may perform a beam refinement procedure similar to the P2 procedure described above to refine a BS beam selection (DL beam selection). In this regard, the BS 105 may transmit beam measurement signals or reference signals (e.g., CSI-RSs) by sweeping narrower beams (e.g., the beams 520 of FIG. 5) over a narrower angular range, for example, close to the wide beam used for establishing the communication at action 410. The UE 115 may determine a received signal measurement (e.g., RSRP and/or RSRQ) for each of BS 105's narrow transmission beam using a fixed received beam (the optimal reception beam determined at action 410). The UE 115 may report the receive signal measurements to the BS, for example, in the form of a sorted list of signal measurements from a highest received signal power to a lowest received signal power or vice versa. In some other examples, the UE 115 may report received signal measurements for DL beams that exceeds a certain threshold. In yet some other examples, the UE 115 may report received signal measurements for N best DL beams (with the higher receive signal measurement among all the DL beams). The BS 105 and/or the UE 115 may select an optimal transmission beam of the BS 105 for subsequent communications.

In some aspects, the beam refinement may also include refining a reception beam selection at the UE 115 similar to the P3 procedure described above. In some aspects, beam refinement (P2 and/or P3) may be performed on-demand and may rely on aperiodic CSI-RSs. For instance, upon beam degradation (e.g., beam quality metrics falling below a threshold), one or more of P2 or P3 may be used to select new or better transmission and/or reception beams.

Figure 5:
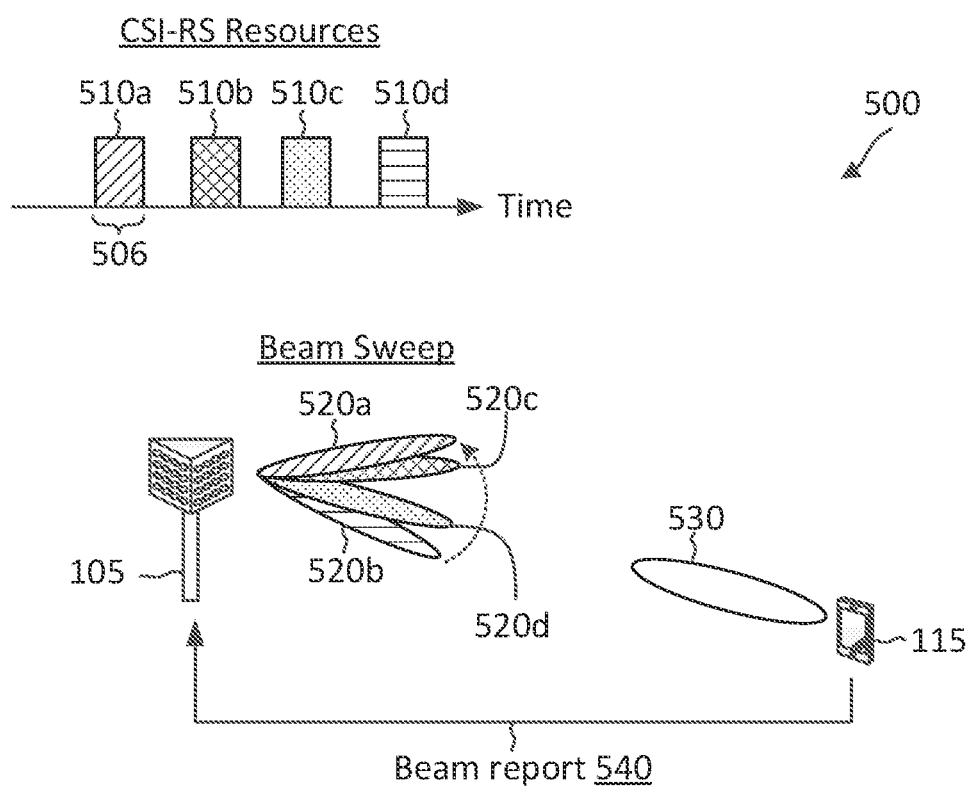
FIG. 5 illustrates a beam refinement scheme that utilizes spatial-division multiplexed beams according to some aspects of the present disclosure.

FIG. 5 illustrates a beam refinement scheme 500 that utilizes spatial-division multiplexed beams according to some aspects of the present disclosure. The scheme 500 may be employed by BSs such as the BSs 105, 105, and TRPs 305 and UEs such as the UEs 115, 115, and 115 in a network such as the networks 100 and/or 300 for communications. In particular, the BS 105 and the UE 115 may perform beam refinement for selecting a DL beam at action 420 using the scheme 500. For simplicity of illustration and discussion, the scheme 500 describes beam refinement from the perspective of a single TRP (e.g., TRP 305a) at the BS 105. However, if the BS 105 utilizes multiple TRPs to communicate with the UE 115, similar beam refinement operations may be performed by each of the TRPs.

In the scheme 500, the BS 105 transmits a series (e.g., a sweep) of transmission beams 520 (shown as 520a, 520b, 520c, and 520d), which may be narrow beams at different angles close to a wide beam used during an initial beam selection (e.g., at action 410). Although FIG. 5 illustrates the BS 105 sweeping across a set of four transmission beams, it should be understood that in other examples the BS 105 may transmit any suitable number of beams in a sweeping pattern. The BS 105 may transmit the series of transmission beams 520a-520d using a set of CSI-RS resources 510 (shown as 510a, 510b, 510c, and 510d). In some instances, the CSI-RS resources 510 may be referred to as non-zero-power-CSI-RS (NZP-CSI-RS) resources. Each CSI-RS resource 510 may include one or more subcarriers (e.g., the subcarriers 204) located at an OFDM symbol 506 (e.g., the symbol 206). A specific CSI-RS resource 510 may correspond to each transmission beam 520. More specifically, the CSI-RS resource 510a may be used for a transmission using the transmission beam 520a, the CSI-RS resource 510b may be used for a transmission using the transmission beam 520b, and so forth. For instance, the BS 105 may transmit a CSI-RS in the CSI-RS resource 510a using the transmission beam 520a, transmit a CSI-RS in the CSI-RS resource 510b using the transmission beam 520b, transmit a CSI-RS in the CSI-RS resource 510c using the transmission beam 520c, and transmit a CSI-RS in the CSI-RS resource 510d using the transmission beam 520d. In other words, the BS 105 may sweep one beam 520 per symbol 506. A CSI-RS may be a reference signal having a predetermined waveform or pre-determine sequence known to the UE 115.

The UE 115 may use a single reception beam 530 during the sweep to receive the CSI-RSs transmitted by BS 105 using the different beams 520a-520d. The UE 115 may determine a received signal measurement (e.g., L1-RSRP) for each CSI-RS resource 510 associated with each transmission beam 520. The UE 115 may transmit a report 540 including the received signal measurements to the BS 105. For instance, the report 540 may include a first received signal measurement for the transmission beam 520a, a second received signal measurement for the transmission beam 520b, a third received signal measurement for the transmission beam 520c, and a fourth received signal measurement for the transmission beam 520d. In some aspects, the UE 115 may indicate the received signal measurements in a sorted list, for example, from a highest received signal measurement to a lowest received signal measurements or vice versa.

In some aspects, the BS 105 may configure the UE 115 with the CSI-RS resources 510 via an RRC configuration (e.g., a UE-specific configuration). Additionally, the BS 105 may configure UE 115 with a reporting configuration for reporting the L1-RSRP measurements for the CSI-RSs in the different beam directions via a UE-specific RRC configuration.

As explained above, when a BS and a UE communicate with each other over a sub-THz frequency band, the BS may sweep through a large number of transmission beams (e.g., about 16, 32, 64 or more) for beam refinement due to the use of narrower beams. For instance, assuming the BS 105 utilizes the same antenna aperture in the sub-THz frequency range as in the mmWave frequency range, each transmission beam may have a significantly narrower beam width due to the shorter wavelengths in the sub-THz frequency range. As such, the BS may sweep a larger set of transmission beams 520 to cover about the same spatial angular sector. If the BS sweeps one beam per symbol 506, the amount of resources and/or the amount of time to sweep through the entire set of beams 520 may increase significantly. Accordingly, the present disclosure provides techniques for a BS to transmit multiple transmission beams simultaneously to reduce beam refinement overhead. FIGS. 6-9 describes various mechanisms for performing beam refinement efficiently.

Figure 6:
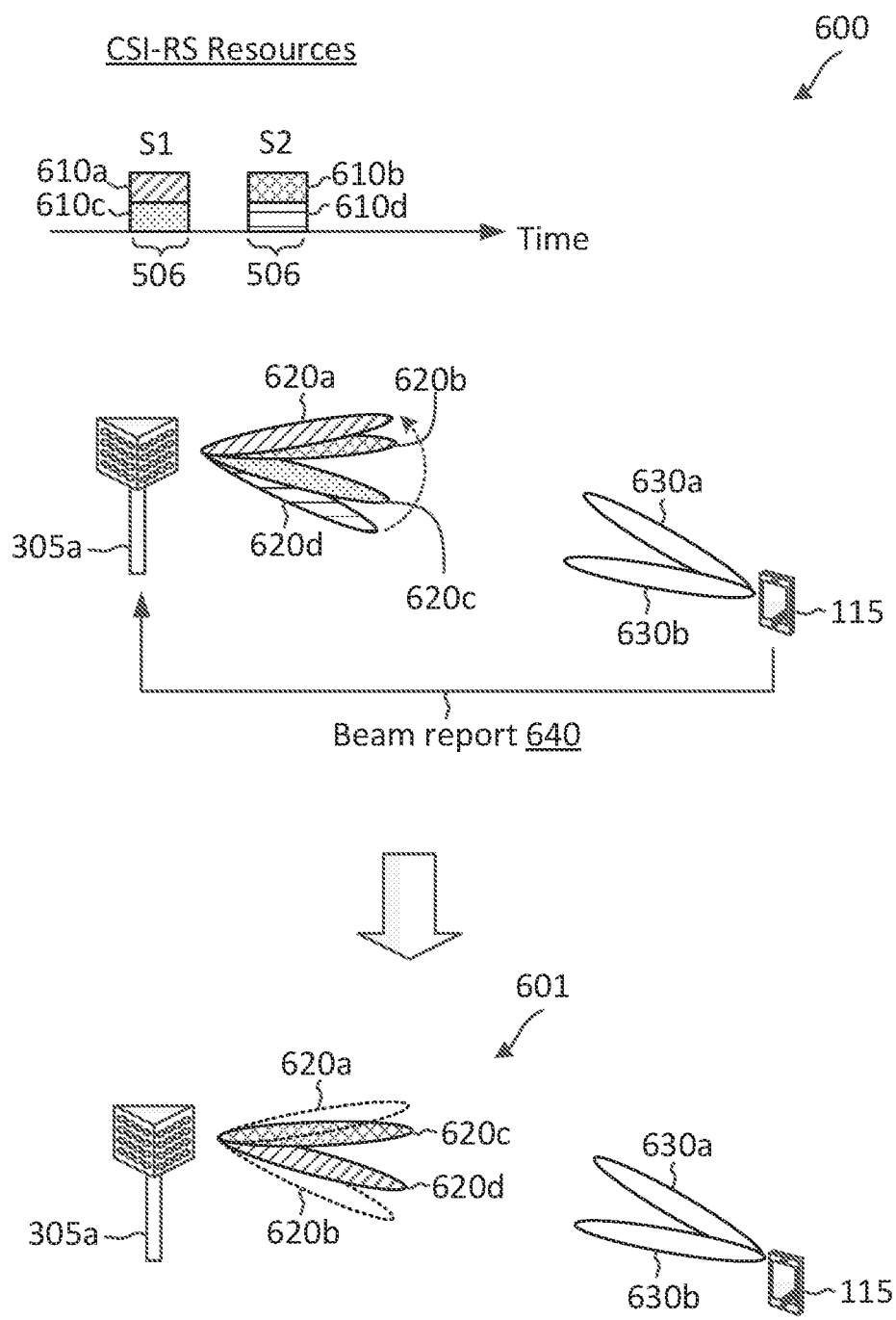
FIG. 6 illustrates a beam refinement scheme that utilizes spatial-division multiplexed beams according to some aspects of the present disclosure.

FIG. 6 illustrates a beam refinement scheme 600 that utilizes spatial-division multiplexed beams according to some aspects of the present disclosure. The scheme 600 may be employed by BSs such as the BSs 105, 105, and TRPs 305 and UEs such as the UEs 115, 115, and 115 in a network such as the networks 100 and/or 300 for communications. In particular, the BS 105 and the UE 115 may perform beam refinement to refine a DL beam using the scheme 600, for example, when operating over a sub-THz frequency band. For instance, the BS 105 and the UE 115 may employ the scheme 600 at action 420 of the method 400. For simplicity of illustration and discussion, the scheme 600 describes beam refinement from the perspective of a single TRP (e.g., TRP 305a) at the BS 105. However, if the BS 105 utilizes multiple TRPs to communicate with the UE 115, similar beam refinement operations may be performed by each of the TRPs.

At a high level, the BS 105 may transmit a plurality of CSI-RSs in a set of beam directions according to a sweeping pattern. The BS 105 may transmit each of the plurality of CSI-RSs in a different beam direction of the set of beam directions. The BS 105 may transmit multiple CSI-RSs in different beam directions simultaneously, for example, during a symbol 506, instead of sweeping one beam per symbol 506 as in the scheme 500. In other words, the scheme 600 allows spatial beam overloading on the same symbol. Accordingly, beam refinement can be completed within a shorter duration when employing the scheme 600.

In the illustrated example of FIG. 6, the BS 105 transmits a series (e.g., a sweep) of transmission beams 620 (shown as 620a, 620b, 620c, and 620d). Similar to the scheme 500, the transmission beams 620 may be narrow beams at different angles close to a wide beam used during an initial beam selection (e.g., at action 410). Although FIG. 6 illustrates the BS 105 sweeping across a set of four transmission beams, it should be understood that in other examples the BS 105 may transmit any suitable number of beams in a sweeping pattern. The BS 105 may transmit the series of transmission beams 620a-620d using a set of CSI-RS resources 610 (shown as 610a, 610b, 610c, and 610d). In some instances, the CSI-RS resources 610 may be referred to as NZP-CSI-RS resources. The set of CSI-RS resources 610 may include two or more CSI-RS resources 610 associated with different beam directions in each symbol 506. Although FIG. 6 illustrates the BS 105 configuring two CSI-RS resources 610 in a symbol 506, it should be understood that in other examples the BS 105 may configure any suitable number of CSI-RS resources (e.g., about 3, 4, 5, or more) in each symbol to reduce beam sweep time for beam refinement.

Each CSI-RS resource 610 may include one or more subcarriers (e.g., the subcarriers 204) located at an OFDM symbol 506 (e.g., the symbol 206). Additionally, multiple CSI-RS resources 610 associated with different transmission beams 620 can be located in the same symbol 506. In some aspects, CSI-RS resources 610 located in the same symbol 506 may include different frequency subcarriers. For example, the CSI-RS resource 610a may include subcarriers with subcarrier indices 2 and 4 within a RB, while the CSI-resource source 610c may include subcarriers with subcarrier indices 10 and 12 within the same RB located in the same symbol 506. In other words, CSI-RS resources 610 located in the same symbol 506 may be non-overlapping in frequency. A specific CSI-RS resource 610 may correspond to each transmission beam 620. More specifically, the CSI-RS resource 610a may be used for a transmission using the transmission beam 620a, the CSI-RS resource 610b may be used for a transmission using the transmission beam 620b, and so forth. For instance, during the symbol 506 S1, the BS 105 may simultaneously transmit a CSI-RS in the CSI-RS resource 610a using the transmission beam 620a and a CSI-RS in the CSI-RS resource 610c using the transmission beam 620c. During the symbol 506 S2, the BS 105 may simultaneously transmit a CSI-RS in the CSI-RS resource 610b using the transmission beam 620b and a CSI-RS in the CSI-RS resource 610d using the transmission beam 620d. In other words, the BS 105 may transmit multiple transmission beams 620 simultaneously during a single symbol 506 using SDM. In some instances, the transmission beams (e.g., the transmission beams 620a and 620c) that are used for simultaneous transmission may be referred to as SDM beams.

In some other aspects, CSI-RS resources 610 located in the same symbol 506 can be partially overlapping or fully overlapping (e.g., including the same frequency subcarriers). For instance, the CSI-RS resource 610a and the CSI-RS resource 610c located in the symbol 506 (shown as S1) may include one or more common subcarriers. To enable the UE 115 to differentiate the CSI-RS transmitted using the transmission beam 620a and the CSI-RS transmitted using the transmission beam 620c, the BS 105 may select transmission beams 620 that are sufficiently separated spatially for simultaneous transmissions. Further, the BS 105 may apply different scrambling sequences (associated with different scrambling IDs) to the CSI-RS transmitted using the transmission beam 620a and the CSI-RS transmitted using the transmission beam 620c.

To assist in reducing beam refinement time, the UE 115 may use two fixed reception beams 630a and 630b to receive the CSI-RSs while the BS 105 sweeps through the beams 620a-620d. In some aspects, the UE 115 may include one or more antenna panels, for example, located on different sides or different edges of the UE. In some aspects, the reception beams 630a and 630b can be generated from the same antenna panel. In some other aspects, the reception beams 630a and 630b can be generated from different antenna panels. The UE 115 may determine a received signal measurement (e.g., L1-RSRP) for each CSI-RS resource 610 associated with each transmission beam 620. In some aspects, during the first symbol 506 S1, the UE 115 may receive the CSI-RS from the CSI-RS resource 610a using the reception beam 630a and may receive the CSI-RS from the CSI-RS resource 610c using the reception beam 630b. During the second symbol 506 S2, the UE 115 may receive the CSI-RS from the CSI-RS resource 610b using the reception beam 630a and may receive the CSI-RS from the CSI-RS resource 610d using the reception beam 630b. The UE 115 may transmit a report 640 including the received signal measurements to the BS 105. For instance, the report 640 may include a first received signal measurement for the transmission beam 620a, a second received signal measurement for the transmission beam 620b, a third received signal measurement for the transmission beam 620c, and a fourth received signal measurement for the transmission beam 620d. In some aspects, the UE 115 may indicate the received signal measurements in a sorted list, for example, from a highest received signal measurement to a lowest received signal measurement or vice versa.

As an example, the BS 105 may determine that the transmission beams 620c and 620d may be most suitable for communicating with the UE 115 based on the report 640. For instance, the report 640 may indicate that each of the third received signal measurement (for the transmission beam 620c) and the fourth received signal measurement (for the transmission beam 620d) satisfies a threshold and/or is higher than the first received signal measurement (for the transmission beam 620a) and the second received signal measurement (for the transmission beam 620b). As shown by 601, the selected transmission beams 620c and 620d are shown as pattern-filled shapes, and the other unselected transmissions beams 620a and 620b are shown as empty shapes.

In some aspects, the BS 105 may configure the UE 115 with the CSI-RS resources 610 via an RRC configuration (e.g., a UE-specific configuration). The BS 105 may configure CSI-RS resources in a variety of ways as will be discussed more fully below with reference FIGS. 8 and 9. Additionally, the BS 105 may configure UE 115 with a reporting configuration for reporting the L1-RSRP measurements for the CSI-RSs in the different beam directions via a UE-specific RRC configuration.

Figure 7:
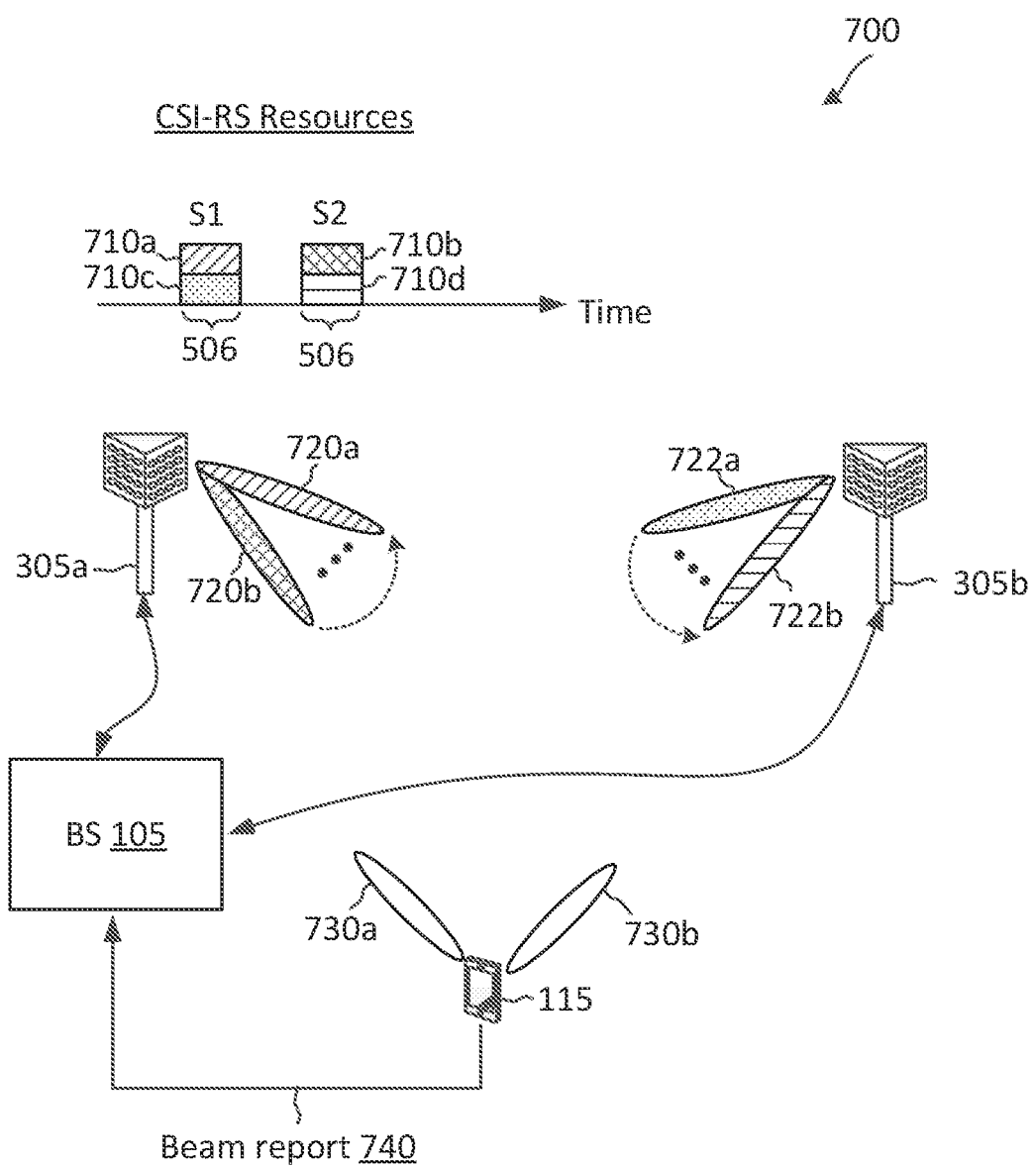
FIG. 7 illustrates a beam refinement scheme that utilizes spatial-division multiplexed beams according to some aspects of the present disclosure.

FIG. 7 illustrates a beam refinement scheme 700 that utilizes spatial-division multiplexed beams according to some aspects of the present disclosure. The scheme 700 may be employed by BSs such as the BSs 105, 105, and TRPs 305 and UEs such as the UEs 115, 115, and 115 in a network such as the networks 100 and/or 300 for communications. In particular, the BS 105 may perform beam refinement with the UE 115 as shown in FIG. 7 when operating over a sub-THz band. For instance, the BS 105 and the UE 115 may employ the scheme 600 at action 420 of the method 400. The scheme 700 is substantially similar to the scheme 600. However, the BS 105 may be communicatively coupled to two TRPs 305 (shown as 305a and 305b) and may communicate with the UE 115 via the TRPs 305.

In the scheme 700, the TRP 305a transmits a series (e.g., a sweep) of transmission beams 720 (shown as 720a, ..., 720b) and the TRP 305b transmits a series (e.g., a sweep) of transmission beams 722 (shown as 722a, 722b) for beam refinement. The transmission beams 720 and 722 may be substantially similar to the beams 620. The BS 105 may configure CSI-RS resources 710 (shown as 710a, 710b, 710c, and 710d) for the TRP 305a to transmit the series of transmission beams 720 and for the TRP 305b to transmit the series of transmission beams 722. In some instances, the CSI-RS resources 710 may be referred to as NZP-CSI-RS resources. The set of CSI-RS resources 710 may include multiple CSI-RS resources 710 associated with different beam directions and/or different TRPs in each symbol 506. For simplicity of illustration and discussion, FIG. 7 illustrates the BS 105 configuring two CSI-RS resources 710 in a same symbol 506. Additionally, FIG. 7 only illustrates resources for the beam 720a, 720b, 722a, and 722b. However, the BS 105 may configure any suitable number of CSI-RS resources (e.g., about 3, 4, 5, or more) in each symbol to reduce beam sweep time for beam refinement and may configure one CSI-RS resource for each transmission beam 720 (associated with a beam sweep) of the TRP 305a associated and the for each transmission beam 722 (associated with a beam sweep) of the TRP 305b.

The CSI-RS resources 710 may be substantially similar to the CSI-RS resources 610. For instance, each CSI-RS resource 710 may include one or more subcarriers (e.g., the subcarriers 204) located at an OFDM symbol 506 (e.g., the symbol 206). Additionally, multiple CSI-RS resources 710 associated with different transmission beams and/or different TRPs can be located in the same symbol 506. In some aspects, CSI-RS resources 710 located in the same symbol 506 may include the same frequency subcarriers. In some aspects, CSI-RS resources 710 located in the same symbol 506 may include different frequency subcarriers.

In the illustrated example of FIG. 7, the CSI-RS resource 710a configured for the transmission beam 720a of the TRP 305a and the CSI-RS resource 710c configured for the transmission beam 722a of the TRP 305b are located in the same symbol 506 S1. Similarly, the CSI-RS resource 710c configured for the transmission beam 720b of the TRP 305a and the CSI-RS resource 710d configured for the transmission beam 722b of the TRP 305b are located in the same symbol 506 S2. the TRP 305a may transmit a CSI-RS in the CSI-RS resource 710a using the transmission beam 720a. Accordingly, during the symbol 506 S1, the TRP 305a may transmit a CSI-RS in the CSI-RS resource 710a using the transmission beam 720a while the TRP 305b transmits a CSI-RS in the CSI-RS resource 710c using the transmission beam 722a. During the symbol 506 S2, the TRP 305a may transmit a CSI-RS in the CSI-RS resource 710b using the transmission beam 720b while the TRP 305b transmits a CSI-RS in the CSI-RS resource 710d using the transmission beam 722b.

Similar to the scheme 600, the UE 115 may use two fixed reception beams 730a and 730b during the sweep to receive the CSI-RSs transmitted by the TRPs 305a and 305b. In some aspects, the reception beam 730a and the reception beam 730b may be from different antenna panels, for example, at different sides of the UE 115 as shown. In some other aspects, the reception beam 730a and the reception beam 730b may be from the same antenna panel at the UE 115. The UE 115 may determine a received signal measurement (e.g., L1-RSRP) for each CSI-RS resource 710 associated with each transmission beam 720 and 722. In some aspects, during the first symbol 506 S1, the UE 115 may receive the CSI-RS from the CSI-RS resource 710a using the reception beam 730a and may receive the CSI-RS from the CSI-RS resource 710c using the reception beam 730b. During the second symbol 506 S2, the UE 115 may receive the CSI-RS from the CSI-RS resource 710b using the reception beam 730a and may receive the CSI-RS from the CSI-RS resource 710d using the reception beam 730b. The UE 115 may transmit a report 740 (e.g., the report 640) including the received signal measurements to the BS 105. For instance, the report 740 may include a first received signal measurement for the transmission beam 720a, a second received signal measurement for the transmission beam 720b, a third received signal measurement for the transmission beam 722a, and a fourth received signal measurement for the transmission beam 722b. In some aspects, the UE 115 may indicate the received signal measurements in a sorted list, for example, from a highest received signal measurement to a lowest received signal measurement or vice versa. In some aspects, the UE 115 may transmit the report 740 via the TRP 305a and/or the TRP 305b.

In some aspects, the BS 105 may configure the UE 115 with the CSI-RS resources 710 via an RRC configuration (e.g., a UE-specific configuration). The BS 105 may configure CSI-RS resources in a variety of ways as will be discussed more fully below with reference FIGS. 7 and 8. Additionally, the BS 105 may configure UE 115 with a reporting configuration for reporting the L1-RSRP measurements for the CSI-RSs in the different beam directions via a UE-specific RRC configuration.

While FIGS. 6 and 7 illustrate the UE 115 using two fixed reception beams during beam refinement, in some other aspects, the UE 115 may use a greater number of fixed reception beams during refinement. In some aspects, the number of fixed reception beams used by the UE 115 during refinement may be dependent on the number of CSI-RS resources with different beam directions are configured in a same symbol.

Figure 8:
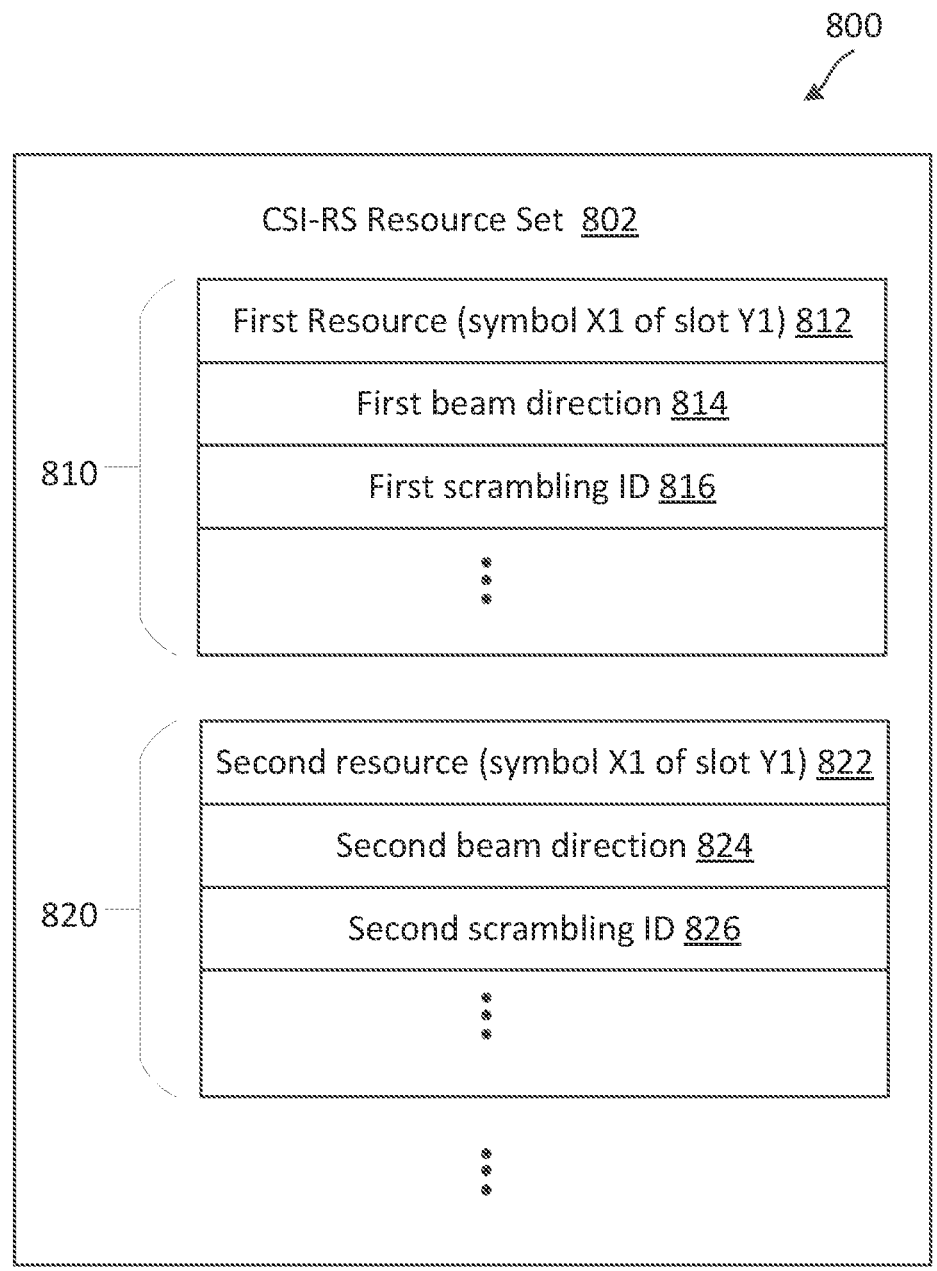
FIG. 8 illustrates a resource configuration for beam refinement with spatial-division multiplexed beams according to some aspects of the present disclosure.

FIG. 8 illustrates a resource configuration scheme 800 for beam refinement with spatial-division multiplexed beams according to some aspects of the present disclosure. The scheme 800 may be employed by BSs such as the BSs 105, TRPs such as the TRPs 305, and UEs such as the UEs 115 in a network such as the networks 100 and/or 300 for communications. In particular, the BS 105 may configure the UE 115 with CSI-RS resources for beam refinement as shown in the scheme 800. The scheme 800 may be implemented in conjunction with the method 400 and the schemes 600 and 700.

In the scheme 800, the BS 105 may configure the UE 115 with a CSI-RS resource set including two or more CSR-RS resources (e.g., the CSI-RS resources 610 and/or 710) associated with different transmission beams (or transmit beam direction) located at the same OFDM symbol (e.g., the symbols 206 and 506). For instance, the BS 105 may configure the UE 115 with a CSI-RS resource set configuration 802. The CSI-RS resource set configuration 802 may indicate a plurality of CSI-RS resources. In the illustrated example of FIG. 8, the CSI-RS resource set configuration 802 include a first indication 810 for a first CSR-RS resource and a second indication 820 for a second CSI-RS resource. Although FIG. 8 illustrates the CSI-RS resource set configuration 802 indicating two CSI-RS resources, it should be understood that in other examples the CSI-RS resource set configuration 802 can include any suitable number of CSI-RS resources (e.g., 3, 4, 5, 6 or more).

The first indication 810 may include a first resource field 812, a first beam direction field 814, and a first scrambling ID field 816. The first resource field 812 may indicate a time-frequency resource location of the first CSI-RS resource. For instance, first resource field 812 may indicate one or more subcarriers (e.g., the subcarriers 204) located in a symbol X1 (e.g., the symbols 206 and 506) within a slot Y1 (e.g., the slot 202). The first beam direction field 814 may indicate an index associated with a certain transmission beam (e.g., the beams 310, 320, 520, 620, 720, and/or 722) in a set of transmission beams used by the BS 105 for DL transmission. The first scrambling ID field 814 may indicate a scrambling ID identifying a certain scrambling sequence used for generating a CSI-RS for transmission in the corresponding time-frequency resource (as indicated by the first resource field 812) and in the corresponding beam direction (as indicated by the first beam direction field 814).

Similarly, the second indication 820 includes a second resource field 822, a second beam direction field 824, and a second scrambling ID field 826 substantially similar to the first resource field 812, the first beam direction field 814, the first scrambling ID field 816, respectively. For instance, the second resource field 822 may indicate one or more subcarriers (e.g., the subcarriers 204) located in a symbol X2 (e.g., the symbols 206 and 506) within a slot Y2 (e.g., the slot 202). The second beam direction field 824 may indicate an index associated with a certain transmission beam (e.g., the beams 310, 320, 520, 620, 720, and/or 722) in a set of transmission beams used by the BS 105 for DL transmission. The second first scrambling ID field 826 may indicate a scrambling ID identifying a certain scrambling sequence used for generating a CSI-RS for transmission in the corresponding time-frequency resource (as indicated by the second resource field 822) and in the corresponding beam direction (as indicated by second beam direction field 824).

In some aspects, the BS 105 may configure the first CSI-RS resource and the second CSI-RS resource to be used for simultaneous CSI-RS transmission with different transmission beams (or different beam directions) for beam refinement. As an example, the first resource field 812 may indicate that the first CSI-RS resource is located in symbol 4 of slot 5, and the first beam direction field 814 may indicate an index identifying a first transmission beam (or first beam direction) associated with the first CSI-RS resource. The second resource field 822 may indicate that the second CSI-RS resource is also located in symbol 4 of slot 5, and the second beam direction field 814 may indicate an index identifying a second transmission beam (or second beam direction) associated with the second CSI-RS resource, where the second transmission beam (or second beam direction) is different from the first transmission beam (or first beam direction).

Referring to the example shown in FIG. 6, the BS 105 may configure the CSI-RS resource 610a by configuring the first resource field 812 to indicate the symbol 506 S1 of a slot and configuring the first beam direction field 814 to indicate the transmission beam 620a. The BS 105 may configure the CSI-RS resource 610c by configuring the second resource field 822 to indicate the same symbol 506 S1 of the same slot and configuring the second beam direction field 824 to indicate the transmission beam 620c. In some aspects, the BS 105 may determine different scrambling IDs for the CSI-RS resource 610a and the CSI-RS resource 610c. The BS 105 may configure the first scrambling ID field 816 field to indicate a first scrambling ID and may configure the second scrambling ID field 826 field to indicate a second scrambling ID different from the first scrambling ID. In some other aspects, the BS 105 may configure the same scrambling ID for the CSI-RS resource 610a and the CSI-RS resource 610c, for example, when the transmission beam 620a and the transmission beam 620c used for the simultaneous transmission are sufficiently separated spatially such that the two transmission beams 620a and 620c may not interfere with each other or at least with a minimal interference.

In some instances, each of the first indication 810 and second indication 820 may include other parameters for each corresponding CSI-RS resource. For instance, an indication for a CSI-RS resource may be provided by a message structure or information element as shown below:

```
NZP-CSI-RS-Resource ::= SEQUENCE {
    nzp-CSI-RS-ResourceId  NZP-CSI-RS-ResourceId,
    resourceMapping        CSI-RS-ResourceMapping,
    powerControlOffset     INTEGER (-8..15),
    powerControlOffsetSS   ENUMERATED{db-3, db0, db3, db6}
                           OPTIONAL, -- Need R
    scramblingID           ScramblingId,
    periodicityAndOffset   CSI-ResourcePeriodicityAndOffset
                           OPTIONAL, -- Cond PeriodicOrSemiPersistent
    qcl-InfoPeriodicCSI-RS TCI-StateId
                           OPTIONAL, -- Cond Periodic
    ...
}.
```

In some aspects, the CSI-RS resource set configuration 802 may also include indications for CSI-RS resources each located at a different symbol. In some aspects, the BS 105 may configure the UE 115 with two more CSI-RS resource sets for beam refinement, where at least one of the CSI-RS resource sets may include CSI-RS resources associated with different transmission beams (or beam directions) located at the same symbol.

Figure 9:
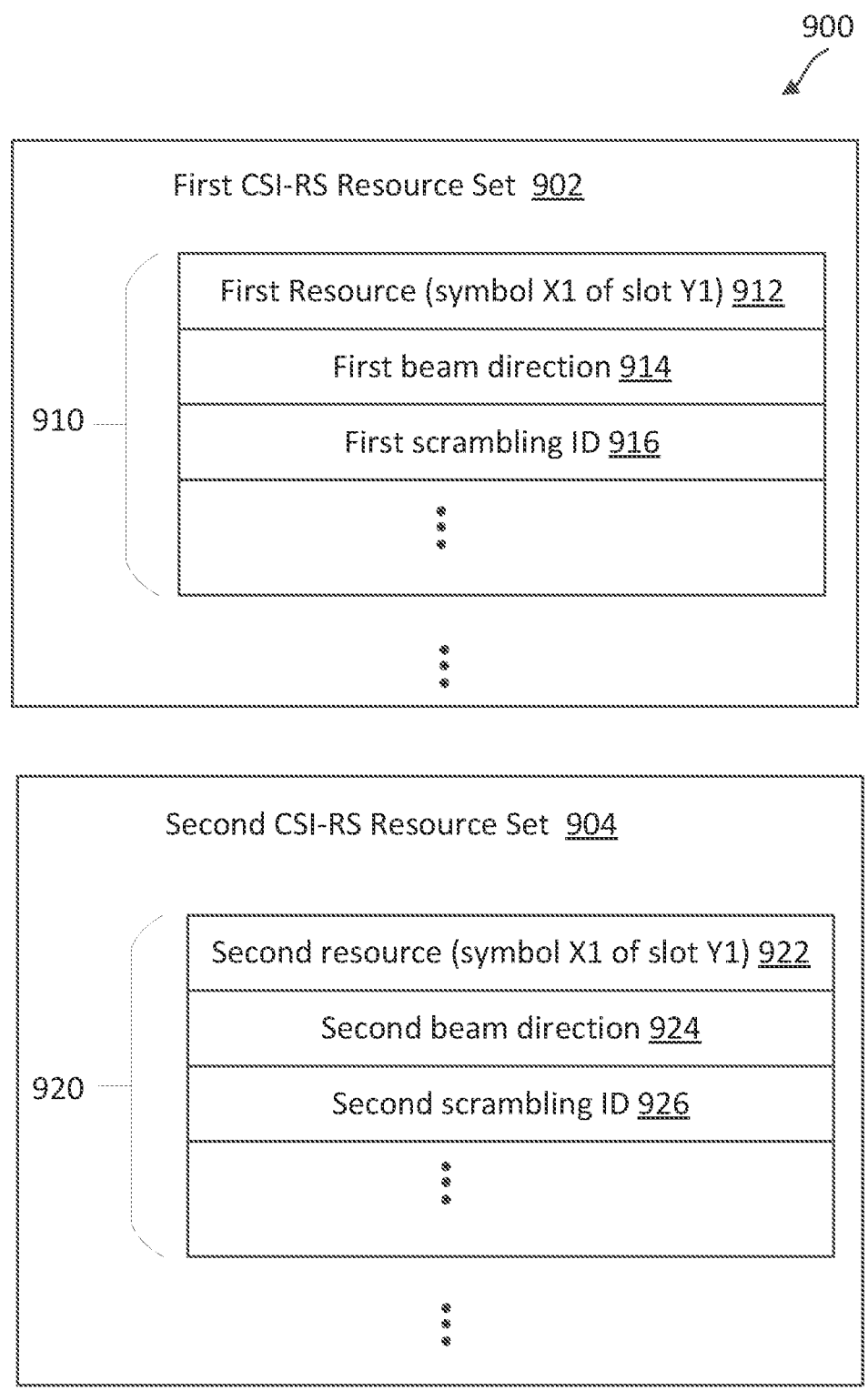
FIG. 9 illustrates a resource configuration scheme for beam refinement with spatial-division multiplexed beams according to some aspects of the present disclosure.

FIG. 9 illustrates a resource configuration scheme 900 for beam refinement with spatial-division multiplexed beams according to some aspects of the present disclosure. The scheme 900 may be employed by BSs such as the BSs 105, 105, and TRPs 305 and UEs such as the UEs 115, 115, and 115 in a network such as the networks 100 and/or 300 for communications. In particular, the BS 105 may configure the UE 115 with CSI-RS resources for beam refinement as shown in the scheme 900. The scheme 900 may be implemented in conjunction with the method 400 and the schemes 600 and 700.

In the scheme 900, the BS 105 may configure the UE 115 with multiple CSI-RS resource sets for simultaneous CSI-RS transmissions using SDM. For instance, each CSI-RS resource set may not include more than one CSI-RS resource per symbol, but different CSI-RS resource sets may include CSI-RS resources located at the same symbol. As shown, the BS 105 may configure the UE 115 with a first CSI-RS resource set configuration 902 for a first CSI-RS resource set and a second CSI-RS resource set configuration 904 for a second CSI-RS resource set. The first CSI-RS resource set configuration 902 may include a first indication 910 for a first CSI-RS resource. The second CSI-RS resource set configuration 904 may include a second indication 920 for a second CSI-RS resource. Although FIG. 9 illustrates two CSI-RS resource set configurations, it should be understood that in other examples the BS 105 may configure the UE 115 with any suitable number of CSI-RS resources sets for simultaneous SDM-based CSI-RS transmissions.

The first indication 910 and the second indication 920 may be substantially similar to the first indication 810 and the second indication 820. As shown, the first indication 910 may include a first resource field 912, a first beam direction field 914, and a first scrambling ID field 916. The first resource field 912 may indicate a time-frequency resource location of the first CSI-RS resource. For instance, first resource field 912 may indicate one or more subcarriers (e.g., the subcarriers 204) located in a symbol X1 (e.g., the symbols 206 and 506) within a slot Y1 (e.g., the slot 202). The first beam direction field 914 may indicate an index associated with a certain transmission beam (e.g., the beams 310, 320, 520, 620, 720, and/or 722) in a set of transmission beams used by the BS 105 for DL transmission. The first scrambling ID field 914 may indicate a scrambling ID identifying a certain scrambling sequence used for generating a CSI-RS for transmission in the corresponding time-frequency resource (as indicated by the first resource field 912) and in the corresponding beam direction (as indicated by the first beam direction field 914).

Similarly, the second indication 920 includes a second resource field 922, a second beam direction field 924, and a second scrambling ID field 926 substantially similar to the first resource field 912, the first beam direction field 914, the first scrambling ID field 916, respectively. For instance, second resource field 922 may indicate one or more subcarriers (e.g., the subcarriers 204) located in a symbol X2 (e.g., the symbols 206 and 506) within a slot Y2 (e.g., the slot 202). The second beam direction field 924 may indicate an index associated with a certain transmission beam (e.g., the beams 310, 320, 520, 620, 720, and/or 722) in a set of transmission beams used by the BS 105 for DL transmission. The second first scrambling ID field 926 may indicate a scrambling ID identifying a certain scrambling sequence used for generating a CSI-RS for transmission in the corresponding time-frequency resource (as indicated by the second resource field 922) and in the corresponding beam direction (as indicated by the second beam direction field 924).

In some aspects, the BS 105 may configure the first CSI-RS resource and the second CSI-RS resource to be used for simultaneous CSI-RS transmission with different transmission beams (or different beam directions) for beam refinement. As an example, the first resource field 912 may indicate that the first CSI-RS resource is located in symbol 4 of slot 5, and the first beam direction field 914 may indicate an index identifying a first transmission beam (or first beam direction) associated with the first CSI-RS resource. The second resource field 922 may indicate that the second CSI-RS resource is also located in symbol 4 of slot 5, and the second beam direction field 914 may indicate an index identifying a second transmission beam (or second beam direction) associated with the second CSI-RS resource, where the second transmission beam (or second beam direction) is different from the first transmission beam (or first beam direction).

Referring to the example shown in FIG. 6, the BS 105 may configure the CSI-RS resource 610*a* by configuring the first resource field 912 to indicate the symbol 506 S1 of a slot and configuring the first beam direction field 914 to indicate the transmission beam 620*a*. The BS 105 may configure the CSI-RS resource 610*c* by configuring the second resource field 922 to indicate the same symbol 506 S1 of the same slot and configuring the second beam direction field 924 to indicate the transmission beam 620*c*. In some aspects, the BS 105 may determine different scrambling IDs for the CSI-RS resource 610*a* and the CSI-RS resource 610*c*. The BS 105 may configure the first scrambling ID field 916 field to indicate a first scrambling ID and may configure the second scrambling ID field 926 field to indicate a second scrambling ID different from the first scrambling ID. In some other aspects, the BS 105 may configure the same scrambling ID for the CSI-RS resource 610*a* and the CSI-RS resource 610*c*, for example, when the transmission beam 620*a* and the transmission beam 620*c* used for the simultaneous transmission are sufficiently separated spatially such that the two transmission beams 620*a* and 620*c* may not interfere with each other or at least with a minimal interference.

In some aspects, each of the first indication 910 and second indication 920 may include other parameters for each corresponding CSI-RS resources as the NZP-CSI-RS-Resource message structure discussed above in reference to FIG. 8. In some aspects, each of the CSI-RS resource set configurations 902 and 904 may include indications for multiple CSI-RS resources each located at a different symbol.

Figure 10:
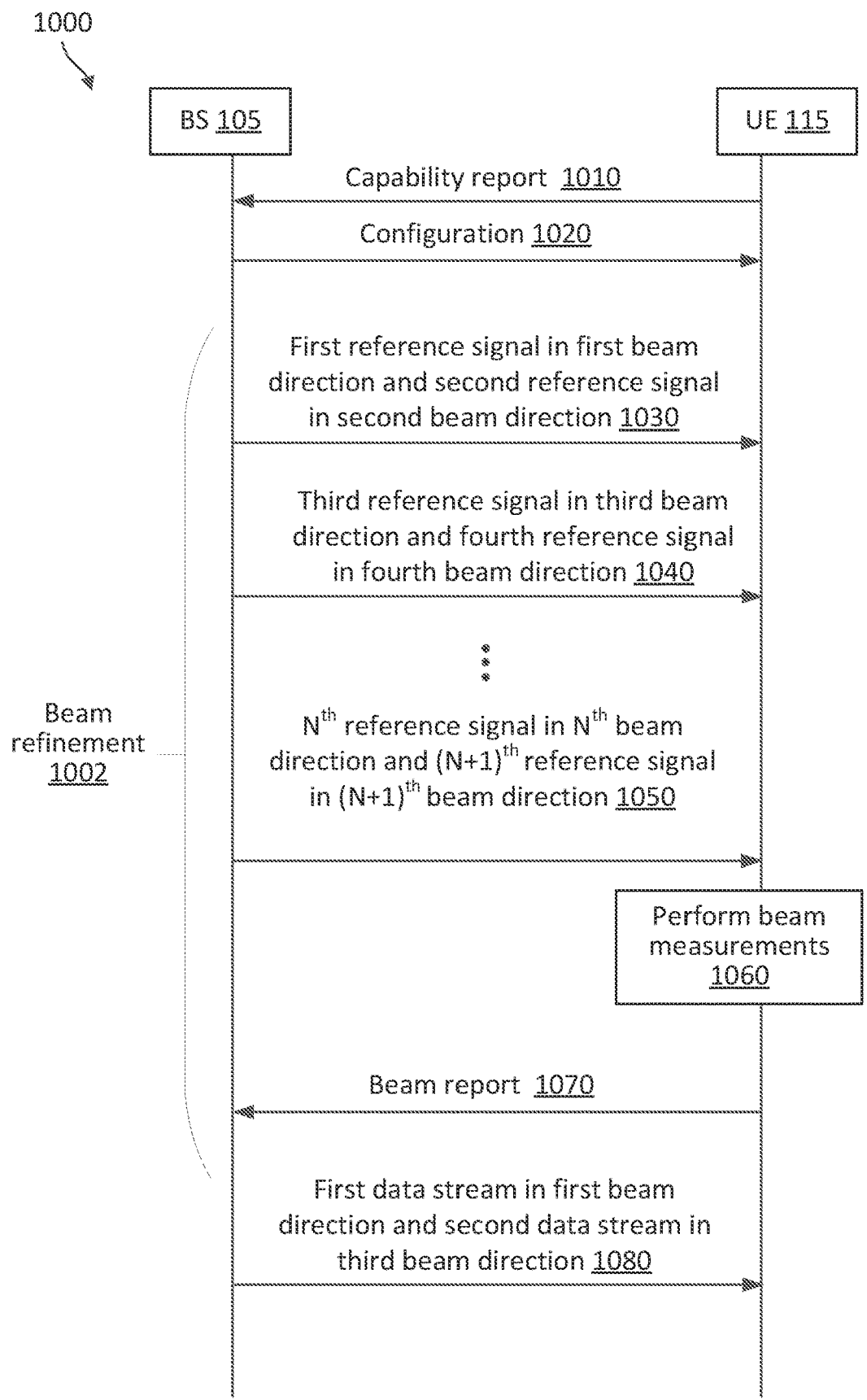
FIG. 10 is a sequence diagram illustrating a beam refinement method that utilizes spatial-division multiplexed beams according to some aspects of the present disclosure.

FIG. 10 is a sequence diagram illustrating a communication method 1000 that utilizes spatial-division multiplexed beams according to some aspects of the present disclosure. The method 1000 may be performed by wireless networks, such as the networks 100 and/or 300 communicating over a high-frequency band, such as a mmWave band or a sub-THz band. In this regard, the method 1000 is performed by a BS 105 and a UE 115. In some instances, the BS 105 may utilize TRPs (e.g., the TRPs 305) to communicate with the UE 115. For simplicity of illustration and discussion, the method 1000 is discussed from the perspective of a single TRP co-located with the BS 105 or at a remote location from the BS 105. However, similar communications may also occur for other TRPs that are in communication with the BS 105. The method 1000 may employ similar mechanisms as discussed above with reference to FIGS. 4-8. In some aspects, the method 1000 may be implemented after the BS 105 and the UE 115 establish a communication with each other. For example, the UE 115 may be in a connected mode (e.g., an RRC connected state). In some aspects, the BS 105 may utilize one or more components, such as the processor 1102, the memory 1104, the beam module 1108, the transceiver 1110, the modem 1112, and the one or more antennas 1116 shown in FIG. 11, to execute the actions of the method 1000. The UE 115 may utilize one or more components, such as the processor 1202, the memory 1204, the beam module 1208, the transceiver 1210, the modem 1212, and the one or more antennas 1216 shown in FIG. 12, to execute the actions of the method 1000. As illustrated, the method 1000 includes a number of enumerated action, but embodiments of the method 1000 may include additional actions before, after, and in between the enumerated actions. In some aspects, one or more of the enumerated actions may be omitted or performed in a different order. In FIG. 10, the arrows grouped by a dashed oval represent simultaneous transmissions.

At action 1010, the UE 115 transmits a capability report to the BS 105. The capability report may indicate that the UE 115 can support simultaneous communications in multiple beam directions. Additionally or alternatively, the capability report may indicate that the UE 115 can support simultaneous receive signal measurements for multiple beam directions (using different reception beams) during the same OFDM symbol (e.g., the symbol 206 and 506). For instance, the capability report may include a report type field indicating support for simultaneous CSI-RS indicator-L1-RSRP (cri-L1-RSRP) beams. The BS 105 may receive the capability report.

At action 1020, the BS 105 configures the UE 115 with a configuration for beam refinement 1002. The configuration may indicate a plurality of resources (e.g., the CSI-RS resources 610 and/or 710) associated with a set of beam directions (e.g., the transmission beams 620, 720, and/or 722) for beam sweep. Each resource may be associated with one beam direction in the set of beam direction. The configuration can be a UE-specific configuration configured specifically for the UE 115. In some aspects, the configuration is an RRC configuration. The BS 105 may configure at least a first resource and a second resource of the plurality of resources on the same symbol (e.g., the symbols 206 and 506), for example, based on the UE 115 indicating the capability at action 1010. In some aspects, the configuration may indicate a resource set including multiple resources (e.g., 2, 3, 4, or more) associated with different beam directions located on the same symbol as discussed above with reference to FIG. 8. In some other aspects, the configuration may indicate multiple resource sets (e.g., 2, 3, 4, or more) for simultaneous transmissions with SDM as discussed above with reference to FIG. 9.

In some aspects, the configuration may also indicate a scrambling ID for each resource of the plurality of resources. In some aspects, the configuration may include a repetition field indicative of whether the BS 105 may repeatedly transmit the same beam. The BS 105 may set the repetition field to "repetition off" to indicate that the beam sweep may not repeat a transmission beam. In other words, the BS 105 may transmit in each beam direction once during the beam refinement 1002.

As part of beam refinement 1002, the BS 105 may transmit a plurality of reference signals (e.g., CSI-RSs) by sweeping through the set of beam directions. For simplicity of illustration and discussion, FIG. 10 illustrates the BS 105 configuring two resources associated with different beam directions in the same symbol for beam sweep. However, the BS 105 may configure any suitable number of resources with different beam direction in the same symbol for beam sweep. For instance, at action 1030, the BS 105 transmits, simultaneously during a first symbol, a first reference signal of the plurality of reference signals in a first beam direction of the set of beam directions and a second reference signal of the plurality of reference signals in a second beam direction of the set of beam directions. The first reference signal may be transmitted in a first resource of the plurality of resources located in a first symbol. The second reference signal may be transmitted in a second resource of the plurality of resources located in the same first symbol. In some aspects, the first resource and the second resource may include different subcarriers in the first symbol. In some aspects, the first resource and the second resource may include at least one overlapping subcarriers in the first symbol. In some aspects, the BS 105 may generate the first reference signal and the second reference signal based on different scrambling IDs.

At action 1040, the BS 105 transmits, simultaneously during a second symbol, a third reference signal of the plurality of reference signals in a third beam direction of the set of beam directions and a fourth reference signal of the plurality of reference signals in a fourth beam direction of the set of beam directions. The third reference signal may be transmitted in a third resource of the plurality of resources located in a second symbol. The fourth reference signal may be transmitted in a fourth resource of the plurality of resources located in the same second symbol. In some aspects, the third resource and the fourth resource may include different subcarriers in the second symbol. In some aspects, the third resource and the fourth resource may include at least one overlapping subcarriers in the second symbol. In some aspects, the BS 105 may generate the third reference signal and the fourth reference signal based on different scrambling IDs.

The BS 105 may continue to sweep through the set of beam directions. For instance, at action 1050, the BS 105 transmits, simultaneously during a $K^{th}$ symbol, an $N^{th}$ reference signal of the plurality of reference signals in an $N^{th}$ beam direction of the set of beam directions and an $(N+1)^{th}$ reference signal of the plurality of reference signals in an $(N+1)^{th}$ beam direction (a last beam direction) of the set of beam directions. The $N^{th}$ reference signal may be transmitted in an $N^{th}$ resource of the plurality of resources located in a $K^{th}$ symbol. The $(N+1)^{th}$ reference signal may be transmitted in a $(N+1)^{th}$ resource of the plurality of resources located in the same $K^{th}$ symbol. In some aspects, the $N^{th}$ resource and the $(N+1)^{th}$ resource may include different subcarriers in the $K^{th}$ symbol. In some aspects, the $N^{th}$ resource and the $(N+1)^{th}$ resource may include at least one overlapping subcarriers in $K^{th}$ symbol. In some aspects, the BS 105 may generate the $N^{th}$ reference signal and the $(N+1)^{th}$ reference signal based on different scrambling IDs.

At action 1060, the UE 115 performs beam measurements while the BS 105 sweeps through the set of beam directions. For instance, the UE 115 may receive one or more of the reference signals. The UE 115 may determine a received signal measurement (e.g., L1-RSRP) for each received reference signal. In some aspects, the UE 115 may utilize two fixed reception beams to receive the reference signals. In other words, the UE 115 may not perform beam sweep while receiving the reference signals from the BS 105. In some instances, the two fixed reception beams may be based on a previous beam selection (e.g., in a P1 procedure). In some instances, the UE 115 may include one or more antenna panels, for example, located on different sides or different edges of the UE. In some instances, the two fixed reception beams can be generated from the same antenna panel. In some other instances, the two fixed reception beams can be generated from different antenna panel. In some instances, the UE 115 may determine received signal measurements for a subset of the reference signals using one of the reception beams and may determine received signal measurements for another subset of the reference signals using the other one of the reception beams.

At action 1070, the UE 115 transmits a beam report to the BS 105. The report may include the received signal measurements determined at action 1060. In some examples, the UE 115 may report the receive signal measurements to the BS, for example, in the form of a sorted list of signal measurements from a highest received signal power to a lowest received signal power or vice versa. In some other examples, the UE 115 may report received signal measurements for beam directions that exceeds a certain threshold. In yet some other examples, the UE 115 may report received signal measurements for N best beam directions (with the higher receive signal measurement among the set of beam directions).

The BS 105 and/or the UE 115 may select an optimal transmission beam of the BS 105 for subsequent communications. In some aspects, the UE 115 may select two (or more) beam directions having the highest received signal measurements (compared to signal measurements of beams not selected). In some other aspects, the BS 105 may select two (or more) beam directions having the highest received signal measurements (compared to signal measurements of beams not selected) based on the report received at action 1070 and may transmit a feedback to the UE 115 indicating the selected beam directions. In some other aspects, the UE 115 or BS 105 may select two (or more) beam directions having received signal measurements satisfying a received signal measurement threshold. As an example, the first reference signal in the first beam direction and the third reference signal in the third beam direction provide the highest received signal measurements at the UE 115. After selecting the two optimal beam directions, the BS 105 and the UE 115 may communicate with each other using the selected beam direction.

For instance, at action 1080, the BS 105 transmits, to the UE 115 simultaneously during one or more symbols, a first data stream in the first beam direction and a second data stream in the third beam direction. Each data stream may carry different information data bits. In other words, the first data stream and the second data stream are spatially multiplexed over the one or more symbols.

Figure 11:
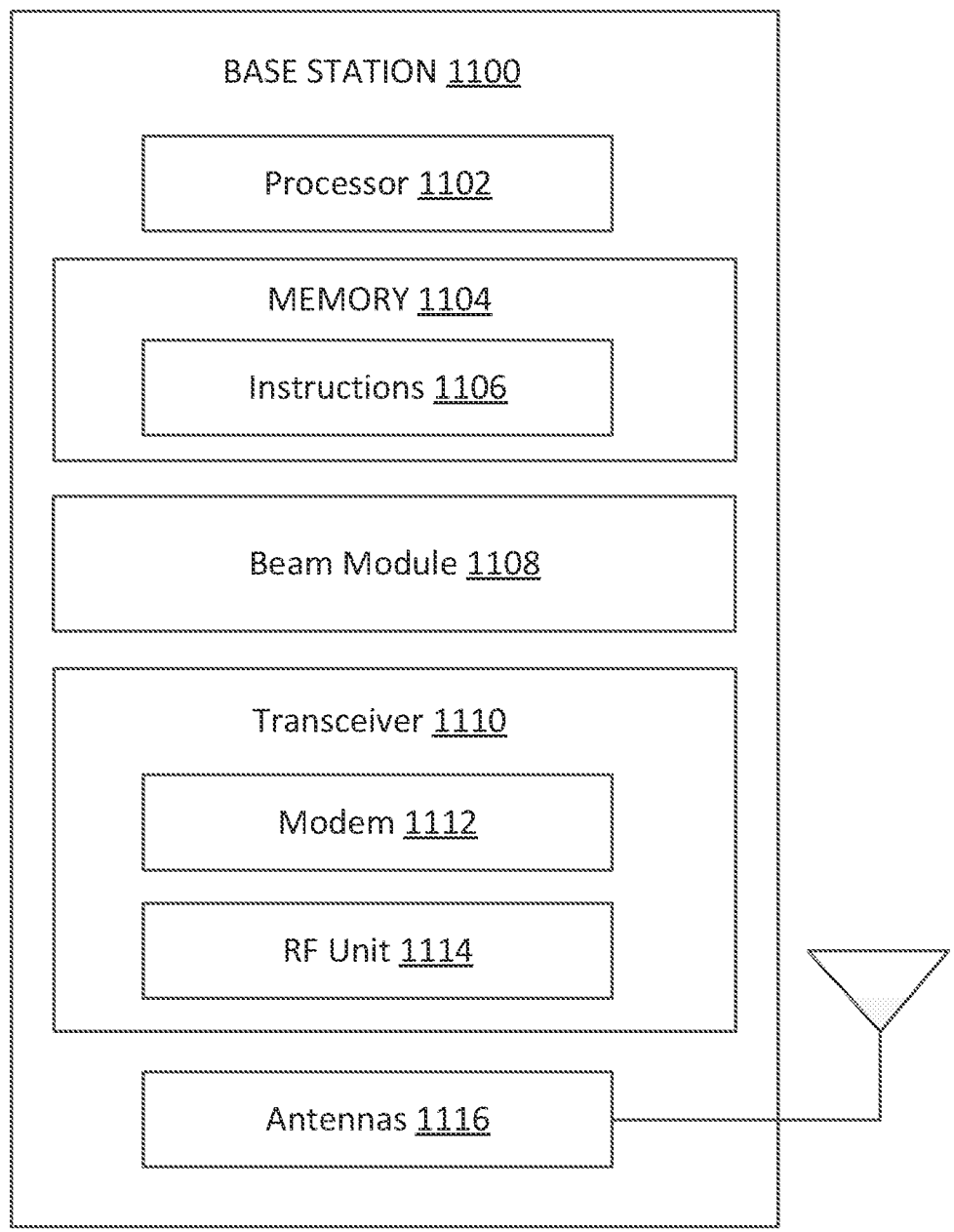
FIG. 11 is a block diagram of an exemplary base station (BS) according to some aspects of the present disclosure.

FIG. 11 is a block diagram of an exemplary BS 1100 according to some aspects of the present disclosure. In some instances, the BS 1100 may be a BS 105 in the network 100 as discussed above in FIG. 1. In some other instances, the BS 1100 may be a TRP 305 in the network 300 as discussed above in FIG. 3. As explained above, a TRP may implement at least RF functionalities, but may also implement some baseband processing and/or protocol stack layer processing similar to a BS. As shown, the BS 1100 may include a processor 1102, a memory 1104, a beam module 1108, a transceiver 1110 including a modem subsystem 1112 and a RF unit 1114, and one or more antennas 1116. These elements may be coupled with one another. The term "coupled" may refer to directly or indirectly coupled or connected to one or more intervening elements. For instance, these elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 1-10. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The beam module 1108 may be implemented via hardware, software, or combinations thereof. For example, the beam module 1108 may be implemented as a processor, circuit, and/or instructions 1106 stored in the memory 1104 and executed by the processor 1102. In some examples, the beam module 1108 can be integrated within the modem subsystem 1112. For example, the beam module 1108 can be implemented by a combination of software components (e.g., executed by a DSP or a general processor) and hardware components (e.g., logic gates and circuitry) within the modem subsystem 1112.

The beam module 1108 may communicate with various components of the BS 1100 to perform various aspects of the present disclosure, for example, aspects of FIGS. 1-10. In some aspects, the beam module 1108 is configured to transmit a plurality of reference signals in a set of beam directions (e.g., using transmission beams 310, 320, 620, 720, and/or 722) to a UE (e.g., the UEs 115 and/or 1200). The beam module 1108 is further configured to transmit the plurality of reference signals by transmitting, simultaneously during a first symbol, at least a first reference signal of the plurality of reference signals in a first beam direction of the set of beam directions and a second reference signal of the plurality of reference signals in a second beam direction of the set of beam directions, where the second beam direction is different from the first beam direction. In some aspects, the BS 1100 is communicatively coupled a first TRP and a second TRP, and the beam module 1108 is configured to transmit the first reference signal via the first TRP and transmit the second reference signal via the second TRP. The beam module 1108 is further configured receive a report indicating received signal measurements (e.g., L1-RSRPs) for two or more beam directions of the set of beam directions from the UE.

In some aspects, the beam module 1108 is configured to transmit, to the UE, an indication of a resource set, for example, as discussed above with reference to FIG. 8. The resource set includes at least a first resource associated with the first beam direction for the first reference signal and a second resource associated with the second beam direction for the second reference signal, where the first resource and the second resource are located in the first symbol.

In some aspects, the beam module 1108 is configured to transmit, to the UE, an indication of a first resource associated with the first beam direction for the first reference signal, wherein the first resource is located in the first symbol. The UE further receives, from the BS, an indication of a second resource associated with the second beam direction for the second reference signal, wherein the second resource is located in the first symbol. The first and second resources may be within different resource sets, for example, as discussed above with reference to FIG. 9.

In some aspects, the beam module 1108 is configured to transmit, to the UE, an indication of a first scrambling identifier (ID) associated with the first reference signal and an indication of a second scrambling ID associated with the second reference signal, wherein the second scrambling ID is different from the first scrambling ID.

In some aspects, the beam module 1108 is configured to receive, from the UE, a capability report indicating support for simultaneous signal measurements in multiple beam directions during a same symbol.

In some aspects, the beam module 1108 is configured to transmit, to the UE during a second symbol, a first data stream in the first beam direction and a second data stream in the third beam direction, where the first data stream is different from the second data stream.

As shown, the transceiver 1110 may include the modem subsystem 1112 and the RF unit 1114. The transceiver 1110 can be configured to communicate bi-directionally with other devices, such as the UEs 115 and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., RRC configuration, CSI-RS resource configuration, CSI-RS report configuration, CSI-RSs, SSB beams) from the modem subsystem 1112 (on outbound transmissions) or of transmissions originating from another source such as a UE 115. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 105 to enable the BS 105 to communicate with other devices.

The RF unit 1114 may provide the modulated and/or processed data, e.g. data packets (or, more generally, data messages that may contain one or more data packets and other information), to the antennas 1116 for transmission to one or more other devices. The antennas 1116 may further receive data messages transmitted from other devices and provide the received data messages for processing and/or demodulation at the transceiver 1110. The transceiver 1110 may provide the demodulated and decoded data (e.g., UE capability report, beam reports) to the beam module 1108 for processing. The antennas 1116 may include multiple antennas of similar or different designs in order to sustain multiple transmission links. In some aspects, the antennas 1116 may in the form of one or more antenna panels or one or more antenna arrays each including a plurality of antenna element that can be selectively configured with different gains and/or phases to generate a beam for transmission and/or reception.

In some aspects, the transceiver 1110 is coupled to components of the BS 1100 and configured to transmit, to a UE, a plurality of reference signals in a set of beam directions (e.g., using transmission beams 310, 320, 620, 720, and/or 722). The transmitting the plurality of reference signals includes transmitting, simultaneously during a first symbol, at least a first reference signal of the plurality of reference signals in a first beam direction of the set of beam directions and a second reference signal of the plurality of reference signals in a second beam direction of the set of beam directions, where the second beam direction is different from the first beam direction. The transceiver 1110 is further configured to receive, from the UE, a report indicating received signal measurements (e.g., L1-RSRPs) for two or more beam directions of the set of beam direction.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Figure 12:
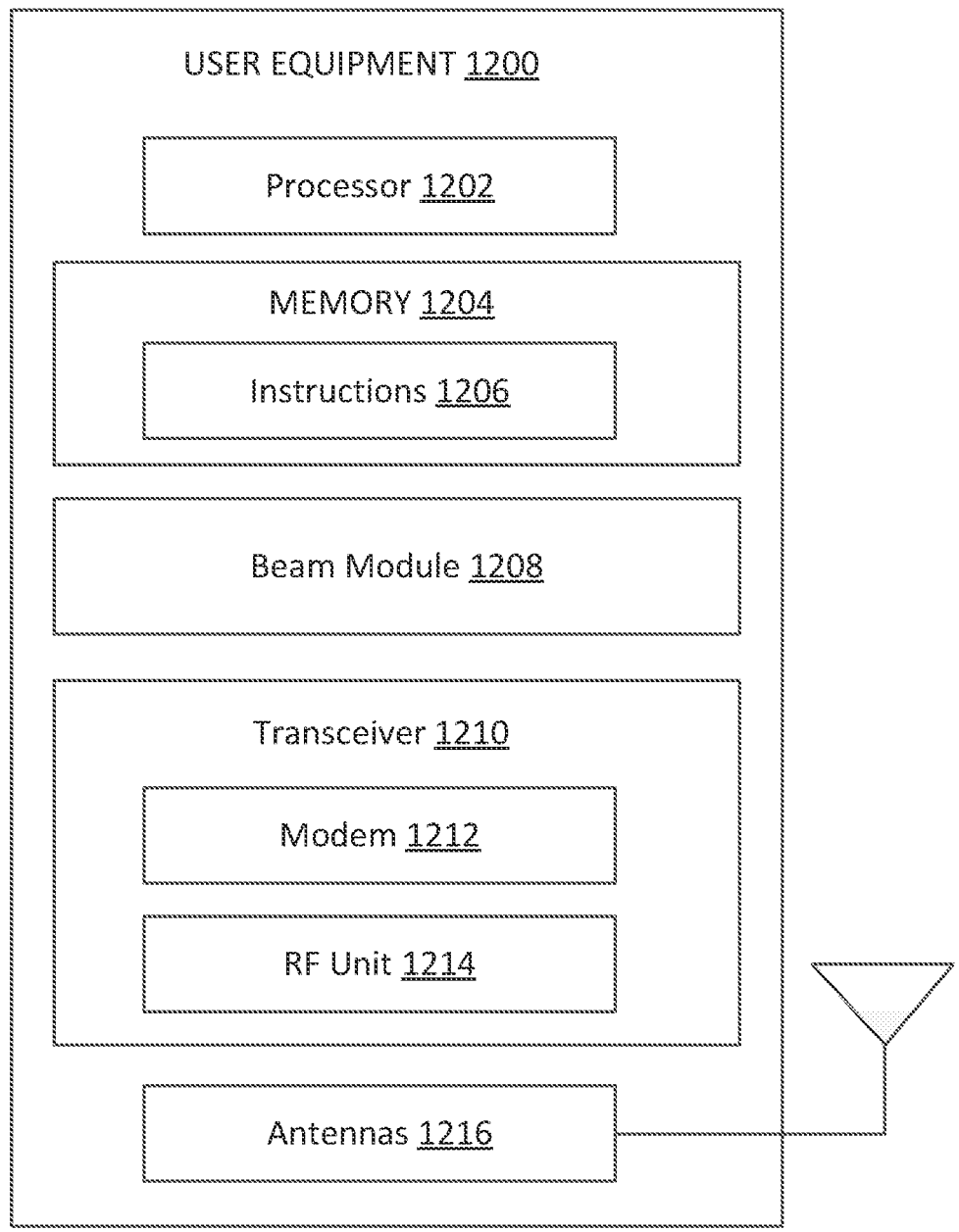
FIG. 12 is a block diagram of an exemplary user equipment (UE) according to some aspects of the present disclosure.

FIG. 12 is a block diagram of an exemplary UE 1200 according to some aspects of the present disclosure. In some instances, the UE 1200 may be a UE 115 as discussed above with respect to FIGS. 1 and 3. As shown, the UE 1200 may include a processor 1202, a memory 1204, a beam module 1208, a transceiver 1210 including a modem subsystem 1212 and a radio frequency (RF) unit 1214, and one or more antennas 1216. These elements may be coupled with one another. The term "coupled" may refer to directly or indirectly coupled or connected to one or more intervening elements. For instance, these elements may be in direct or indirect communication with each other, for example via one or more buses.

The processor 1202 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1202 may also be implemented as a combination of computing devices, e.g., a combination of a DSP and a microprocessor, a plurality of microprocessors, one or more microprocessors in conjunction with a DSP core, or any other such configuration.

The memory 1204 may include a cache memory (e.g., a cache memory of the processor 1202), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1204 includes a non-transitory computer-readable medium. The memory 1204 may store, or have recorded thereon, instructions 1206. The instructions 1206 may include instructions that, when executed by the processor 1202, cause the processor 1202 to perform the operations described herein with reference to the UEs 115 in connection with aspects of the present disclosure, for example, aspects of FIGS. 2-10. Instructions 1206 may also be referred to as program code, which may be interpreted broadly to include any type of computer-readable statement(s) as discussed above with respect to FIG. 11.

The beam module 1208 may be implemented via hardware, software, or combinations thereof. For example, the beam module 1208 may be implemented as a processor, circuit, and/or instructions 1206 stored in the memory 1204 and executed by the processor 1202. In some examples, the beam module 1208 can be integrated within the modem subsystem 1212. For example, the beam module 1208 can be implemented by a combination of software components (e.g., executed by a DSP or a general processor) and hardware components (e.g., logic gates and circuitry) within the modem subsystem 1212.

The beam module 1208 may communicate with various components of the UE 1200 to perform aspects of the present disclosure, for example, aspects of FIGS. 2-10. In some aspects, the beam module 1208 is configured to receive a plurality of reference signals in a set of beam directions from a BS (e.g., the BSs 105, 105, and/or 1100 and/or TRPs 305). The beam module 1208 is further configured receive transmit the plurality of reference signals by receiving, simultaneously during a first symbol, at least a first reference signal of the plurality of reference signals in a first beam direction of the set of beam directions and a second reference signal of the plurality of reference signals in a second beam direction of the set of beam directions, where the second beam direction is different from the first beam direction. In some aspects, the beam module 1208 is configured to receive the first reference signal using a first reception beam (e.g., the reception beams 630 and 730) and the second reference signal using a second reception beam different from the first reception beam. In some aspects, the first reception beam and the second reception beam are generated from the same antenna panel (e.g., at the antennas 1216). For instance, the beam module 1208 is configured to configure gains and/or phases of antenna elements on the antenna panel to generate the first and second reception beams. In some other aspects, the first reception beam and the second reception beam are generated from different antenna panels at the UE. For instance, the UE may configure gains and/or phases of antenna elements on each of the antenna panels to generate the first and second reception beams. In some aspects, the UE receives the first reference signal via a first TRP associated with the BS and may receive the second reference signal via a second TRP associated with the BS, where the first TRP is different from the second TRP.

At block 1320, the UE transmits, to the BS, a report indicating received signal measurements (e.g., L1-RSRPs) for two or more beam directions of the set of beam directions. In some aspects, the report may include a first received signal measurement for the first reference signal in the first beam direction and a second received signal measurement for a third reference signal of the plurality of reference signals in a third beam direction of the set of beam directions, wherein the third beam direction is different from the first beam direction.

In some aspects, the UE receives, from the BS, an indication of a resource set, for example, as discussed above with reference to FIG. 8. The resources set includes a first resource associated with the first beam direction for the first reference signal and a second resource associated with the second beam direction for the second reference signal, where the first resource and the second resource are located in the first symbol.

In some aspects, the UE receives, from the BS, an indication of a first resource associated with the first beam direction for the first reference signal, wherein the first resource is located in the first symbol. The UE further receives, from the BS, an indication of a second resource associated with the second beam direction for the second reference signal, wherein the second resource is located in the first symbol. The first and second resources may be within different resource sets, for example, as discussed above with reference to FIG. 9.

In some aspects, the UE receives, from the BS, an indication of a first scrambling identifier (ID) associated with the first reference signal and an indication of a second scrambling ID associated with the second reference signal, wherein the second scrambling ID is different from the first scrambling ID.

In some aspects, the UE transmits, to the BS, a capability report indicating support for simultaneous signal measurements in multiple beam directions during a same symbol.

In some aspects, the UE receives, from the BS during a second symbol, a first data stream in the first beam direction and a second data stream in the third beam direction, where the first data stream is different from the second data stream.

As shown, the transceiver 1210 may include the modem subsystem 1212 and the RF unit 1214. The transceiver 1210 can be configured to communicate bi-directionally with other devices, such as the BSs 105. The modem subsystem 1212 may be configured to modulate and/or encode the data from the memory 1204 and/or the beam module 1208 according to a modulation and coding scheme (MCS), e.g., a low-density parity check (LDPC) coding scheme, a turbo coding scheme, a convolutional coding scheme, a digital beamforming scheme, etc. The RF unit 1214 may be configured to process (e.g., perform analog to digital conversion or digital to analog conversion, etc.) modulated/encoded data (e.g., UE capability report, beam reports) from the modem subsystem 1212 (on outbound transmissions) or of transmissions originating from another source such as a UE 115 or a BS 105. The RF unit 1214 may be further configured to perform analog beamforming in conjunction with the digital beamforming. Although shown as integrated together in transceiver 1210, the modem subsystem 1212 and the RF unit 1214 may be separate devices that are coupled together at the UE 115 to enable the UE 115 to communicate with other devices.

The RF unit 1214 may provide the modulated and/or processed data, e.g. data packets (or, more generally, data messages that may include one or more data packets and other information), to the antennas 1216 for transmission to one or more other devices. The antennas 1216 may further receive data messages transmitted from other devices. The antennas 1216 may provide the received data messages for processing and/or demodulation at the transceiver 1210. The transceiver 1210 may provide the demodulated and decoded data (e.g., RRC configuration, CSI-RS resource configuration, CSI-RS report configuration, CSI-RSs, SSB beams) to the beam module 1208 for processing. The antennas 1216 may include multiple antennas of similar or different designs in order to sustain multiple transmission links. The RF unit 1214 may configure the antennas 1216. In some aspects, the antennas 1216 may in the form of one or more antenna panels or one or more antenna arrays each including a plurality of antenna element that can be selectively configured with different gains and/or phases to generate a beam for transmission and/or reception.

In some aspects, the transceiver 1210 is coupled to components of the UE 1200 and configured to receive, from a BS, a plurality of reference signals in a set of beam directions (e.g., using transmission beams 310, 320, 620, 720, and/or 722). The receiving the plurality of reference signals includes transmitting, simultaneously during a first symbol, at least a first reference signal of the plurality of reference signals in a first beam direction of the set of beam directions and a second reference signal of the plurality of reference signals in a second beam direction of the set of beam directions, where the second beam direction is different from the first beam direction. The transceiver 1210 is further configured to transmit, to the UE, a report indicating received signal measurements (e.g., L1-RSRPs) for two or more beam directions of the set of beam direction.

In an aspect, the UE 1200 can include multiple transceivers 1210 implementing different RATs (e.g., NR and LTE). In an aspect, the UE 1200 can include a single transceiver 1210 implementing multiple RATs (e.g., NR and LTE). In an aspect, the transceiver 1210 can include various components, where different combinations of components can implement different RATs.

Figure 13:
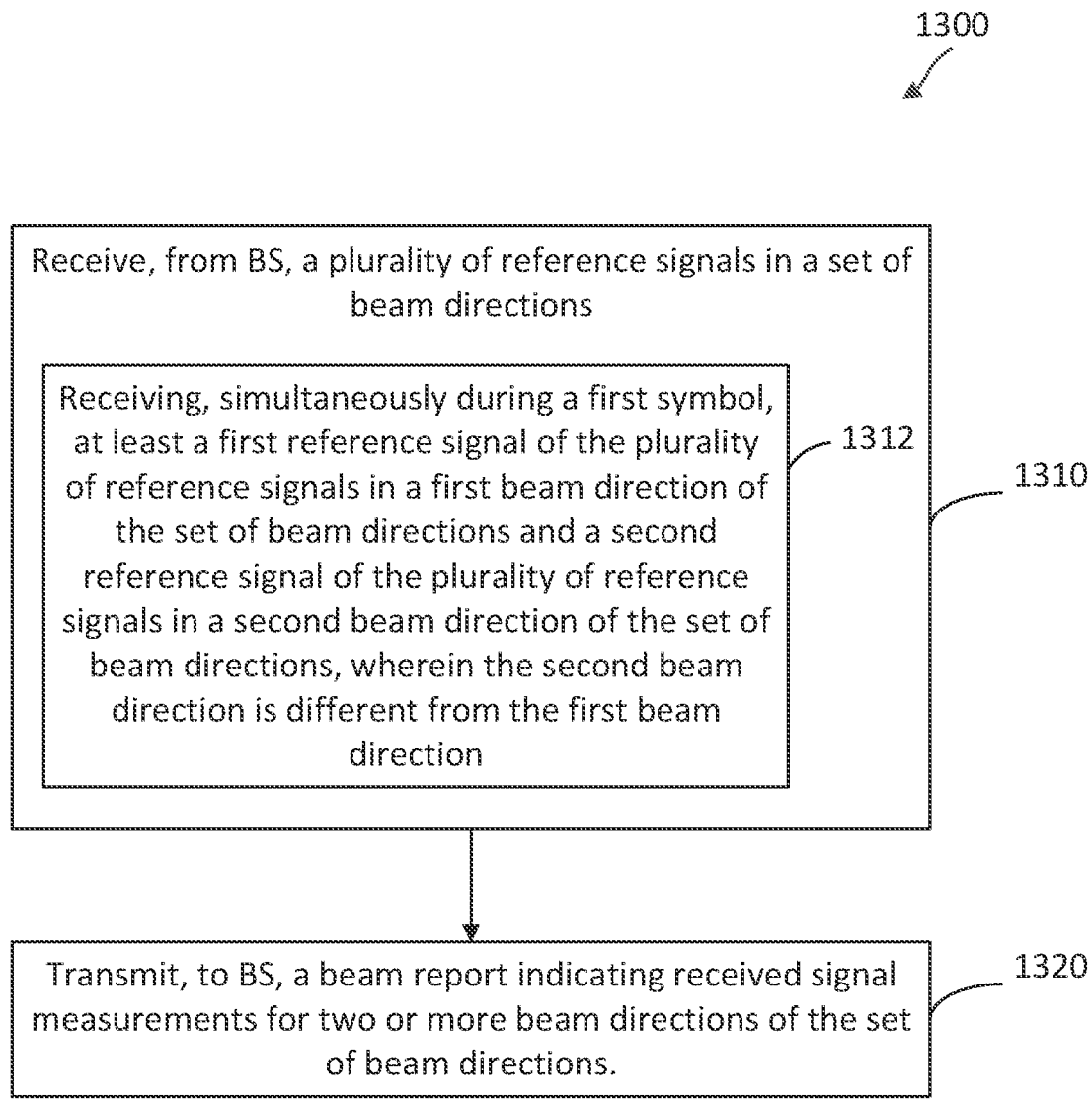
FIG. 13 is a flow diagram of a wireless communication method according to some aspects of the present disclosure.

FIG. 13 is a flow diagram of a wireless communication method 1300 according to some aspects of the present disclosure. Aspects of the method 1300 can be executed by a computing device (e.g., a processor, processing circuit, and/or other suitable component) of a wireless communication device or other suitable means for performing the steps. For example, a wireless communication device, such as the UEs 115 and/or 1200 may utilize one or more components, such as the processor 1202, the memory 1204, the beam module 1208, the transceiver 1210, the modem 1212, and the one or more antennas 1216, to execute the steps of method 1300. The method 1300 may employ similar mechanisms as described above in FIGS. 2-10. As illustrated, the method 1300 includes a number of enumerated steps, but aspects of the method 1300 may include additional steps before, after, and in between the enumerated steps. In some aspects, one or more of the enumerated steps may be omitted or performed in a different order.

At block 1310, a UE receives, from a BS, a plurality of reference signals in a set of beam directions. The receiving the plurality of reference signals includes, at block 1312, receiving, simultaneously during a first symbol, at least a first reference signal of the plurality of reference signals in a first beam direction of the set of beam directions and a second reference signal of the plurality of reference signals in a second beam direction of the set of beam directions, where the second beam direction is different from the first beam direction. In some aspects, the UE receives the first reference signal using a first reception beam (e.g., the reception beams 630 and 730) and the second reference signal using a second reception beam different from the first reception beam. In some aspects, the first reception beam and the second reception beam are generated from the same antenna panel at the UE. For instance, the UE may configure gains and/or phases of antenna elements on the antenna panel to generate the first and second reception beams. In some other aspects, the first reception beam and the second reception beam are generated from different antenna panels at the UE. For instance, the UE may configure gains and/or phases of antenna elements on each of the antenna panels to generate the first and second reception beams. In some aspects, the UE receives the first reference signal via a first TRP associated with the BS and may receive the second reference signal via a second TRP associated with the BS, where the first TRP is different from the second TRP. In some aspects, the UE may utilize one or more components, such as the processor 1202, the memory 1204, the beam module 1208, the transceiver 1210, the modem 1212, and the one or more antennas 1216, to perform the operations of block 1310.

At block 1320, the UE transmits, to the BS, a beam report indicating received signal measurements (e.g., L1-RSRPs) for two or more beam directions of the set of beam directions. In some aspects, the beam report may include a first received signal measurement for the first reference signal in the first beam direction and a second received signal measurement for a third reference signal of the plurality of reference signals in a third beam direction of the set of beam directions, wherein the third beam direction is different from the first beam direction. In some aspects, the UE may utilize one or more components, such as the processor 1202, the memory 1204, the beam module 1208, the transceiver 1210, the modem 1212, and the one or more antennas 1216, to perform the operations of block 1320.

In some aspects, the UE receives, from the BS, an indication of a resource set, for example, as discussed above with reference to FIG. 8. The resources set includes a first resource associated with the first beam direction for the first reference signal and a second resource associated with the second beam direction for the second reference signal, where the first resource and the second resource are located in the first symbol.

In some aspects, the UE receives, from the BS, an indication of a first resource associated with the first beam direction for the first reference signal, wherein the first resource is located in the first symbol. The UE further receives, from the BS, an indication of a second resource associated with the second beam direction for the second reference signal, wherein the second resource is located in the first symbol. The first and second resources may be within different resource sets, for example, as discussed above with reference to FIG. 9.

In some aspects, the UE receives, from the BS, an indication of a first scrambling identifier (ID) associated with the first reference signal and an indication of a second scrambling ID associated with the second reference signal, wherein the second scrambling ID is different from the first scrambling ID.

In some aspects, the UE transmits, to the BS, a capability report indicating support for simultaneous signal measurements in multiple beam directions during a same symbol.

In some aspects, the UE receives, from the BS during a second symbol, a first data stream in the first beam direction and a second data stream in the third beam direction, where the first data stream is different from the second data stream.

Figure 14:
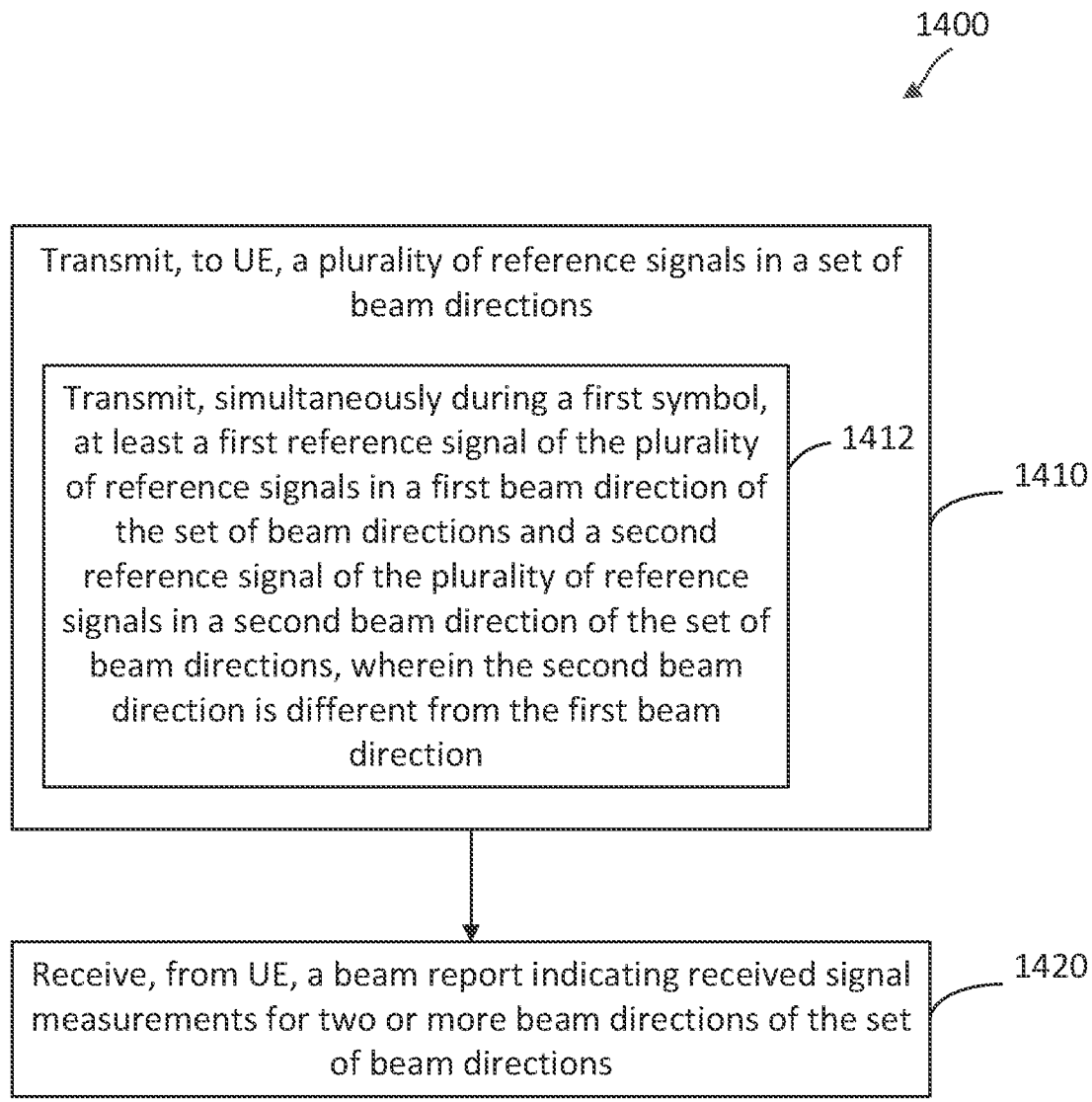
FIG. 14 is a flow diagram of a wireless communication method according to some aspects of the present disclosure.

FIG. 14 is a flow diagram of a wireless communication method 1400 according to some aspects of the present disclosure. Aspects of the method 1400 can be executed by a computing device (e.g., a processor, processing circuit, and/or other suitable component) of a wireless communication device or other suitable means for performing the steps. For example, a wireless communication device, such as the BSs 105, the BS 1100, and/or TRPs 305, may utilize one or more components, such as the processor 1102, the memory 1104, the beam module 1108, the transceiver 1110, the modem 1112, and the one or more antennas 1116, to execute the steps of method 1400. The method 1400 may employ similar mechanisms as described above in FIGS. 2-10. As illustrated, the method 1400 includes a number of enumerated steps, but aspects of the method 1400 may include additional steps before, after, and in between the enumerated steps. In some aspects, one or more of the enumerated steps may be omitted or performed in a different order.

At block 1410, the BS transmits, to a UE, a plurality of reference signals in a set of beam directions (e.g., using transmission beams 310, 320, 620, 720, and/or 722). The transmitting the plurality of reference signal includes, at block 1412, transmitting, simultaneously during a first symbol, at least a first reference signal of the plurality of reference signals in a first beam direction of the set of beam directions and a second reference signal of the plurality of reference signals in a second beam direction of the set of beam directions, where the second beam direction is different from the first beam direction. In some aspects, the BS transmits the first reference signal via a first TRP associated with the BS and the second reference signal via a second TRP associated with the BS, where the first TRP is different from the second TRP. In some aspects, the BS may utilize one or more components, such as the processor 1102, the memory 1104, the beam module 1108, the transceiver 1110, the modem 1112, and the one or more antennas 1116, to perform the operations of block 1410.

At block 1420, the BS receives, from the UE, a beam report indicating received signal measurements (e.g., L1-RSRPs) for two or more beam directions of the set of beam directions. In some aspects, the beam report may include a first received signal measurement for the first reference signal in the first beam direction and a second received signal measurement for a third reference signal of the plurality of reference signals in a third beam direction of the set of beam directions, wherein the third beam direction is different from the first beam direction. In some aspects, the BS may utilize one or more components, such as the processor 1102, the memory 1104, the beam module 1108, the transceiver 1110, the modem 1112, and the one or more antennas 1116, to perform the operations of block 1420.

In some aspects, the BS transmits, to the UE, an indication of a resource set, for example, as discussed above with reference to FIG. 8. The resources includes at least a first resource associated with the first beam direction for the first reference signal and a second resource associated with the second beam direction for the second reference signal, where the first resource and the second resource are located in the first symbol.

In some aspects, the BS transmits, to the UE, an indication of a first resource associated with the first beam direction for the first reference signal, wherein the first resource is located in the first symbol. The UE further receives, from the BS, an indication of a second resource associated with the second beam direction for the second reference signal, wherein the second resource is located in the first symbol. The first and second resources may be within different resource sets, for example, as discussed above with reference to FIG. 9.

In some aspects, the BS transmits, to the UE, an indication of a first scrambling identifier (ID) associated with the first reference signal and an indication of a second scrambling ID associated with the second reference signal, wherein the second scrambling ID is different from the first scrambling ID.

In some aspects, the BS receives, from the UE, a capability report indicating support for simultaneous signal measurements in multiple beam directions during a same symbol.

In some aspects, the BS transmits, to the UE during a second symbol, a first data stream in the first beam direction and a second data stream in the third beam direction, where the first data stream is different from the second data stream.

Further aspects of the present disclosure include the followings:

1. A method of wireless communication performed by a user equipment (UE), the method comprising:
    receiving, from a base station (BS), a plurality of reference signals in a set of beam directions, wherein the receiving comprises:
        receiving, simultaneously during a first symbol, at least a first reference signal of the plurality of reference signals in a first beam direction of the set of beam directions and a second reference signal of the plurality of reference signals in a second beam direction of the set of beam directions, wherein the second beam direction is different from the first beam direction; and
    transmitting, to the BS, a beam report indicating received signal measurements for two or more beam directions of the set of beam directions.

2. The method of aspect 1, wherein the receiving the at least the first reference signal and the second reference signal comprises:
    receiving, using a first reception beam, the first reference signal; and
    receiving, using a second reception beam different from the first reception beam, the second reference signal.

3. The method of any of aspects 1-2, wherein the first reception beam is associated with an antenna panel of the UE, and wherein the second reception beam is also associated with the antenna panel.

4. The method of any of aspects 1-3, wherein the first reception beam is associated with a first antenna panel of the UE, and wherein the second reception beam is associated with a second antenna panel of the UE different from the first antenna panel.

5. The method of any of aspects 1-3, wherein the receiving the at least the first reference signal and the second reference signal comprises:
    receiving, from a first transmission-reception point (TRP) associated with the BS during the first symbol, the first reference signal in the first beam direction; and
    receiving, from a second TRP associated with the BS during the first symbol, the second reference signal in the second beam direction, wherein the second TRP is different from the first TRP.

6. The method of any of aspects 1-5, further comprising:
    receiving, from the BS, an indication of a resource set comprising:
        a first resource associated with the first beam direction for the first reference signal, wherein the first resource is located in the first symbol; and
        a second resource associated with the second beam direction for the second reference signal, wherein the second resource is located in the first symbol.

7. The method of any of aspects 1-5, further comprising:
    receiving, from the BS, an indication of a first resource associated with the first beam direction for the first reference signal, wherein the first resource is located in the first symbol; and receiving, from the BS, an indication of a second resource associated with the second beam direction for the second reference signal, wherein the second resource is located in the first symbol.

8. The method of any of aspects 1-7, further comprising:
    receiving, from the BS, an indication of a first scrambling identifier (ID) associated with the first reference signal and an indication of a second scrambling ID associated with the second reference signal, wherein the second scrambling ID is different from the first scrambling ID.

9. The method of any of aspects 1-8, further comprising:
    transmitting, to the BS, a capability report indicating support for simultaneous signal measurements in multiple beam directions during a same symbol.

10. The method of any of aspects 1-9, wherein the transmitting the report comprises:
    transmitting, to the BS, the report including a first received signal measurement for the first reference signal in the first beam direction and a second received signal measurement for a third reference signal of the plurality of reference signals in a third beam direction of the set of beam directions, wherein the third beam direction is different from the first beam direction, and wherein the first received signal measurement and the second received signal measurement are selected based on at least one of:
having highest received signal measurements compared to received signal measurements of beam directions not selected, or
satisfying a received signal measurement threshold.

11. The method of any of aspects 1-10, further comprising:
receiving, from the BS during a second symbol, a first data stream in the first beam direction; and receiving, from the BS during the second symbol, a second data stream in the third beam direction, wherein the first data stream is different from the second data stream.

12. A method of wireless communication performed by a base station (BS), the method comprising:
transmitting, to a user equipment (UE), a plurality of reference signals in a set of beam directions, wherein the transmitting comprises:
transmitting, simultaneously during a first symbol, at least a first reference signal of the plurality of reference signals in a first beam direction of the set of beam directions and a second reference signal of the plurality of reference signals in a second beam direction of the set of beam directions, wherein the second beam direction is different from the first beam direction; and
receiving, from the UE, a beam report indicating received signal measurements for two or more beam directions of the set of beam directions.

13. The method of aspect 12, further comprising:
transmitting, to the UE, an indication of a resource set comprising:
a first resource associated with the first beam direction for the first reference signal, wherein the first resource is located in the first symbol; and
a second resource associated with the second beam direction for the second reference signal, wherein the second resource is located in the first symbol.

14. The method of aspect 12, further comprising:
transmitting, to the UE, an indication of a first resource associated with the first beam direction for the first reference signal, wherein the first resource is located in the first symbol; and
transmitting, to the UE, an indication of a second resource associated with the second beam direction for the second reference signal, wherein the second resource is located in the first symbol.

15. The method of any of aspects 12-14, further comprising:
transmitting, to the UE, an indication of a first scrambling identifier (ID) associated with the first reference signal and an indication of a second scrambling ID associated with the second reference signal, wherein the second scrambling ID is different from the first scrambling ID.

16. The method of any of aspects 12-15, wherein:
the transmitting the at least the first reference signal and the second reference signal comprises:
transmitting, from a first transmission-reception point (TRP) associated with the BS during the first symbol, the first reference signal in the first beam direction; and
transmitting, from a second TRP associated with the BS during the first symbol, the second reference signal in the second beam direction, wherein the second TRP is different from the first TRP.

17. The method of any of aspects 12-16, further comprising:
receiving, from the UE, a capability report indicating support for simultaneous communications in multiple beam directions.

18. The method of any of aspects 12-17, wherein the receiving the beam report comprises:
receiving, from the UE, the beam report including a first received signal measurement for the first reference signal in the first beam direction and a second received signal measurement for a third reference signal of the plurality of reference signals in a third beam direction of the set of beam directions, wherein the third beam direction is different from the first beam direction.

19. The method of any of aspects 12-18, further comprising:
transmitting, to the UE during a second symbol, a first data stream in the first beam direction; and
transmitting, to the UE during the second symbol, a second data stream in the third beam direction, wherein the first data stream is different from the second data stream.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:
   receiving an indication of a resource set comprising:
   a first resource associated with a first beam direction and a first subcarrier for a first reference signal, wherein the first resource is located in a first symbol;
   a second resource associated with a second beam direction and a second subcarrier for a second reference signal, wherein the second resource is located in the first symbol and the second subcarrier is different from the first subcarrier;
   receiving a plurality of reference signals in a set of beam directions, wherein the receiving comprises:
   receiving, simultaneously during the first symbol, at least the first reference signal of the plurality of reference signals in the first beam direction of the set of beam directions and the second reference signal of the plurality of reference signals in the second beam direction of the set of beam directions, wherein the second beam direction is different from the first beam direction; and
   transmitting a beam report indicating received signal measurements for two or more beam directions of the set of beam directions.

2. The method of claim 1, wherein the receiving the at least the first reference signal and the second reference signal comprises:
   receiving, using a first reception beam, the first reference signal; and
   receiving, using a second reception beam different from the first reception beam, the second reference signal.

3. The method of claim 2, wherein the first reception beam is associated with an antenna panel of the UE, and wherein the second reception beam is associated with the antenna panel of the UE.

4. The method of claim 2, wherein the first reception beam is associated with a first antenna panel of the UE, and wherein the second reception beam is associated with a second antenna panel of the UE different from the first antenna panel.

5. The method of claim 1, wherein the receiving the at least the first reference signal and the second reference signal comprises:
   receiving, from a first transmission-reception point (TRP) associated with a base station (BS) during the first symbol, the first reference signal in the first beam direction; and
   receiving, from a second TRP associated with the BS during the first symbol, the second reference signal in the second beam direction, wherein the second TRP is different from the first TRP.

6. The method of claim 1, further comprising:
   receiving an indication of the first resource associated with the first beam direction for the first reference signal, wherein the first resource is located in the first symbol; and
   receiving an indication of the second resource associated with the second beam direction for the second reference signal, wherein the second resource is located in the first symbol.

7. The method of claim 1, further comprising:
   receiving an indication of a first scrambling identifier (ID) associated with the first reference signal and an indication of a second scrambling ID associated with the second reference signal, wherein the second scrambling ID is different from the first scrambling ID.

8. The method of claim 1, further comprising:
   transmitting a capability report indicating support for simultaneous signal measurements in multiple beam directions during a same symbol.

9. The method of claim 1, wherein the transmitting the beam report comprises:
   transmitting the beam report including a first received signal measurement for the first reference signal in the first beam direction and a second received signal measurement for a third reference signal of the plurality of reference signals in a third beam direction of the set of beam directions, wherein the third beam direction is different from the first beam direction, and wherein the first received signal measurement and the second received signal measurement are selected based on at least one of:
   having highest received signal measurements compared to received signal measurements of beam directions not selected, or
   satisfying a received signal measurement threshold.

10. The method of claim 9, further comprising:
    receiving, during a second symbol, a first data stream in the first beam direction; and
    receiving, during the second symbol, a second data stream in the third beam direction, wherein the first data stream is different from the second data stream.

11. A method of wireless communication performed by a base station (BS), the method comprising:
    transmitting, to a user equipment (UE), an indication of a resource set comprising:
    a first resource associated with a first beam direction and a first subcarrier for a first reference signal, wherein the first resource is located in a first symbol;
    a second resource associated with a second beam direction and a second subcarrier for a second reference signal, wherein the second resource is located in the first symbol and the second subcarrier is different from the first subcarrier;
    transmitting, to the UE, a plurality of reference signals in a set of beam directions, wherein the transmitting comprises:
    transmitting, simultaneously during the first symbol, at least the first reference signal of the plurality of reference signals in the first beam direction of the set of beam directions and the second reference signal of the plurality of reference signals in the second beam direction of the set of beam directions, wherein the second beam direction is different from the first beam direction; and
    receiving, from the UE, a beam report indicating received signal measurements for two or more beam directions of the set of beam directions.

12. The method of claim 11, further comprising:
    transmitting, to the UE, an indication of the first resource associated with the first beam direction for the first reference signal, wherein the first resource is located in the first symbol; and transmitting, to the UE, an indication of the second resource associated with the second beam direction for the second reference signal, wherein the second resource is located in the first symbol.

13. The method of claim 11, further comprising:
transmitting, to the UE, an indication of a first scrambling identifier (ID) associated with the first reference signal and an indication of a second scrambling ID associated with the second reference signal, wherein the second scrambling ID is different from the first scrambling ID.

14. The method of claim 11, wherein:
the transmitting the at least the first reference signal and the second reference signal comprises:
transmitting, from a first transmission-reception point (TRP) associated with the BS during the first symbol, the first reference signal in the first beam direction; and
transmitting, from a second TRP associated with the BS during the first symbol, the second reference signal in the second beam direction, wherein the second TRP is different from the first TRP.

15. The method of claim 11, further comprising:
receiving, from the UE, a capability report indicating support for simultaneous communications in multiple beam directions.

16. The method of claim 11, wherein the receiving the beam report comprises:
receiving, from the UE, the beam report including a first received signal measurement for the first reference signal in the first beam direction and a second received signal measurement for a third reference signal of the plurality of reference signals in a third beam direction of the set of beam directions, wherein the third beam direction is different from the first beam direction.

17. The method of claim 16, further comprising:
transmitting, to the UE during a second symbol, a first data stream in the first beam direction; and
transmitting, to the UE during the second symbol, a second data stream in the third beam direction, wherein the first data stream is different from the second data stream.

18. A user equipment (UE) comprising:
a processor; and
a transceiver coupled to the processor, wherein the UE is configured to:
receive an indication of a resource set comprising:
a first resource associated with a first beam direction and a first subcarrier for a first reference signal, wherein the first resource is located in a first symbol;
a second resource associated with a second beam direction and a second subcarrier for a second reference signal, wherein the second resource is located in the first symbol and the second subcarrier is different from the first subcarrier;
receive a plurality of reference signals in a set of beam directions, wherein the receiving comprises:
receiving, simultaneously during the first symbol, at least the first reference signal of the plurality of reference signals in the first beam direction of the set of beam directions and the second reference signal of the plurality of reference signals in the second beam direction of the set of beam directions, wherein the second beam direction is different from the first beam direction; and
transmit a beam report indicating received signal measurements for two or more beam directions of the set of beam directions.

19. The UE of claim 18, further comprising:
one or more antenna panels configured to generate a first reception beam and a second reception beam,
wherein the UE configured to receive the at least the first reference signal and the second reference signal is further configured to:
receive, using the first reception beam, the first reference signal; and
receive, using the second reception beam different from the first reception beam, the second reference signal.

20. The UE of claim 19, wherein the one or more antenna panels configured to generate the first reception beam and the second reception beam is configured to:
generate the first reception beam and the second reception beam from a first antenna panel of the one or more antenna panels.

21. The UE of claim 19, wherein the one or more antenna panels configured to generate the first reception beam and the second reception beam is configured to:
generate the first reception beam from a first antenna panel of the one or more antenna panels; and
generate the second reception beam from a second antenna panel of the one or more antenna panels, wherein the first antenna panel is different from the second antenna panel.

22. The UE of claim 18, wherein the UE configured to receive the at least the first reference signal and the second reference signal is configured to:
receive, from a first transmission-reception point (TRP) associated with a base station (BS) during the first symbol, the first reference signal in the first beam direction; and
receive, from a second TRP associated with the BS during the first symbol, the second reference signal in the second beam direction, wherein the second TRP is different from the first TRP.

23. The UE of claim 18, wherein the UE is further configured to:
receive an indication of a first resource associated with the first beam direction for the first reference signal and an indication of a second resource associated with the second beam direction for the second reference signal, wherein the first resource and the second resource are located in a same symbol.

24. The UE of claim 18, wherein the UE is further configured to:
transmit a capability report indicating support for simultaneous signal measurements in multiple beam directions during a same symbol.

25. A base station (BS) comprising:
a processor; and
a transceiver coupled to the processor, wherein the BS is configured to:
transmit, to a user equipment (UE), an indication of a resource set comprising:
a first resource associated with a first beam direction and a first subcarrier for a first reference signal, wherein the first resource is located in a first symbol;
a second resource associated with a second beam direction and a second subcarrier for a second reference signal, wherein the second resource is located in the first symbol and the second subcarrier is different from the first subcarrier;
transmit, to the UE, a plurality of reference signals in a set of beam directions, wherein the transmitting comprises:
transmitting, simultaneously during the first symbol, at least the first reference signal of the plurality of reference signals in the first beam direction of the set of beam directions and the second reference signal of the plurality of reference signals in the second beam direction of the set of beam directions, wherein the second beam direction is different from the first beam direction; and receiving, from the UE, a beam report indicating received signal measurements for two or more beam directions of the set of beam directions.

26. The BS of claim 25, wherein the BS is further configured to:
transmit, to the UE, an indication of the first resource associated with the first beam direction for the first reference signal and an indication of the second resource associated with the second beam direction for the second reference signal, wherein the first resource and the second resource are located in the same symbol.

27. The BS of claim 25, wherein the BS configured to transmit the at least the first reference signal and the second reference signal is further configured to:
transmit, via a first transmission-reception point (TRP) associated with the BS during the first symbol, the first reference signal in the first beam direction; and
transmit, via a second TRP associated with the BS during the first symbol, the second reference signal in the second beam direction, wherein the second TRP is different from the first TRP.

28. The BS of claim 25, wherein the BS is further configured to:
receive, from the UE, a capability report indicating support for simultaneous communications in multiple beam directions.

* * * * *